(12) United States Patent
Shiohara et al.

(10) Patent No.: US 9,422,125 B2
(45) Date of Patent: *Aug. 23, 2016

(54) SHEET FEED DEVICE AND IMAGE RECORDING APPARATUS HAVING SUCH SHEET FEED DEVICE

(71) Applicant: Brother Kogyo Kabushiki Kaisha, Nagoya-shi, Aichi-ken (JP)

(72) Inventors: Yukio Shiohara, Nagoya (JP); Tetsuo Asada, Kuwana (JP); Yuji Koga, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,223

(22) Filed: Feb. 23, 2015

(65) Prior Publication Data

US 2015/0166278 A1   Jun. 18, 2015

Related U.S. Application Data

(60) Continuation of application No. 14/224,747, filed on Mar. 25, 2014, now Pat. No. 8,967,614, which is a continuation of application No. 13/429,067, filed on Mar. 23, 2012, now Pat. No. 8,714,540, which is a (Continued)

(30) Foreign Application Priority Data

| Mar. 30, 2005 | (JP) | 2005-099607 |
| Mar. 30, 2005 | (JP) | 2005-099608 |
| Mar. 30, 2005 | (JP) | 2005-099609 |
| Mar. 30, 2005 | (JP) | 2005-099610 |

(51) Int. Cl.
*B65H 3/44* (2006.01)
*B41J 11/48* (2006.01)

(Continued)

(52) U.S. Cl.
CPC ............... *B65H 3/44* (2013.01); *B41J 11/485* (2013.01); *B41J 13/103* (2013.01); *B65H 1/04* (2013.01);

(Continued)

(58) Field of Classification Search
CPC .............. B65H 3/44; B65H 2405/332; B65H 2405/32
See application file for complete search history.

(56) References Cited

U.S. PATENT DOCUMENTS 3,989,236 A   11/1976   Komori et al.
4,017,181 A    4/1977   Komaba et al.

(Continued)

FOREIGN PATENT DOCUMENTS

CN   1448325 A   10/2003
CN   1451554 A   10/2003

(Continued)

OTHER PUBLICATIONS

State Intellectual Property Office of the People'S Republic of China, Notification of First Office Action issued for counterpart Chinese Patent Application No. 201310173074.0, mailed May 6, 2015.

(Continued)

*Primary Examiner* — Howard Sanders
(74) *Attorney, Agent, or Firm* — Baker Botts L.L.P.

(57) ABSTRACT

An image recording apparatus including a first tray having a first holding portion for holding sheets, a second tray disposed above the first tray and including a second holding portion for holding sheets, a sheet feeder that selectively feeds a sheet from one of the first tray and the second tray in a sheet feed direction, a recording unit that records an image on the sheet fed by the sheet feeder, and a discharge roller that discharges the sheet on which the image is recorded by the recording unit. The second holding portion of the second tray moves above the first holding portion of the first tray. The second tray further includes a discharged sheet receiving portion for receiving the sheet discharged by the discharge roller. The second tray including the discharged sheet receiving portion pivots relative to the first tray.

21 Claims, 29 Drawing Sheets

Related U.S. Application Data continuation of application No. 13/111,781, filed on May 19, 2011, now Pat. No. 8,342,503, which is a continuation of application No. 12/603,628, filed on Oct. 22, 2009, now Pat. No. 7,963,517, which is a division of application No. 11/277,624, filed on Mar. 28, 2006, now Pat. No. 7,694,950.

(51) Int. Cl.

| | | |
|---|---|---|
| B41J 13/10 | (2006.01) | |
| B65H 1/04 | (2006.01) | |
| B65H 1/22 | (2006.01) | |
| B65H 1/28 | (2006.01) | |
| B65H 3/06 | (2006.01) | |
| B65H 1/26 | (2006.01) | |
| B65H 3/66 | (2006.01) | |

(52) U.S. Cl.
CPC ............... *B65H 1/22* (2013.01); *B65H 1/266* (2013.01); *B65H 1/28* (2013.01); *B65H 3/0669* (2013.01); *B65H 3/66* (2013.01); *B65H 2301/422548* (2013.01); *B65H 2405/32* (2013.01); *B65H 2405/332* (2013.01); *B65H 2601/322* (2013.01); *B65H 2701/1131* (2013.01)

(56) References Cited

U.S. PATENT DOCUMENTS

| | | | |
|---|---|---|---|
| 4,108,427 | A | 8/1978 | Komori et al. |
| 4,131,274 | A | 12/1978 | Sue |
| 4,196,898 | A | 4/1980 | Misawa et al. |
| 4,538,799 | A | 9/1985 | Bhagwat et al. |
| 4,553,831 | A | 11/1985 | Dixon et al. |
| 5,060,926 | A | 10/1991 | Murai et al. |
| 5,138,343 | A | 8/1992 | Aichi et al. |
| 5,287,164 | A | 2/1994 | Watanabe |
| 5,346,197 | A | 9/1994 | Takano et al. |
| 5,383,655 | A | 1/1995 | Hayakawa et al. |
| 5,622,364 | A | 4/1997 | Dutton et al. |
| 5,711,517 | A | 1/1998 | Kelly |
| 5,737,682 | A | 4/1998 | Yamagishi |
| 5,927,702 | A | 7/1999 | Ishii et al. |
| 6,406,201 | B1 | 6/2002 | Beretta et al. |
| 6,435,745 | B1 | 8/2002 | Yamada |
| 6,651,974 | B2 | 11/2003 | Kawarama et al. |
| 6,659,444 | B2 | 12/2003 | Kawarama |
| 6,904,844 | B2 | 6/2005 | Koizumi et al. |
| 7,051,653 | B2 | 5/2006 | Ono |
| 7,413,183 | B2 | 8/2008 | Asada et al. |
| 7,628,392 | B2 | 12/2009 | Shiohara et al. |
| 7,654,515 | B2 | 2/2010 | Koga |
| 8,807,553 | B2 | 8/2014 | Asada et al. |
| 2003/0184003 | A1 | 10/2003 | Asada et al. |
| 2003/0184004 | A1 | 10/2003 | Shiohara et al. |
| 2004/0017037 | A1 | 1/2004 | Kawakami et al. |
| 2004/0130089 | A1 | 7/2004 | Suzuki et al. |

FOREIGN PATENT DOCUMENTS

| | | |
|---|---|---|
| CN | 1453140 A | 11/2003 |
| JP | S54-022090 B2 | 8/1979 |
| JP | S60-056740 A | 4/1985 |
| JP | S61-127531 A | 6/1986 |
| JP | S61-188337 A | 8/1986 |
| JP | S61-277525 A | 12/1986 |
| JP | S62-011844 A | 1/1987 |
| JP | H02-163222 A | 6/1990 |
| JP | H03-095038 A | 4/1991 |
| JP | H03-297741 A | 12/1991 |
| JP | H06-100190 A | 4/1994 |
| JP | H06-049439 U | 7/1994 |
| JP | H07-115500 A | 5/1995 |
| JP | 3025763 U | 4/1996 |
| JP | H08-019927 A | 7/1996 |
| JP | H11-059925 A | 3/1999 |
| JP | H11-314773 A | 11/1999 |
| JP | 2000-044067 A | 2/2000 |
| JP | 2000-044074 A | 2/2000 |
| JP | 2001-019185 A | 1/2001 |
| JP | 2001-253564 A | 9/2001 |
| JP | 2002-037469 A | 2/2002 |
| JP | 2002-255385 A | 9/2002 |
| JP | 2002-321838 A | 11/2002 |
| JP | 2002-338070 A | 11/2002 |
| JP | 2002-249242 A | 3/2003 |
| JP | 2004-043171 A | 2/2004 |
| JP | 2005-029300 A | 2/2005 |

OTHER PUBLICATIONS

The State Intellectual Property Office of the People's Republic of China, Notification of the Third Office Action for Chinese Patent Application No. 201010568575.5 (related to co-pending U.S. Appl. No. 14/224,747), issued Dec. 27, 2012.
Japan Patent Office, Notice of Reasons for Rejection for Japanese Patent Application No. 2012-131763 (related to co-pending U.S. Appl. No. 14/224,747), mailed Jun. 4, 2013.
Japan Patent Office, Notice of Reasons for Rejection for Japanese Patent Application No. 2012-131764 (related to co-pending U.S. Appl. No. 14/224,747), mailed Jul. 2, 2013.
Japan Patent Office, Office Action for Japanese Patent Application No. 2005-099608 (related to co-pending U.S. Appl. No. 14/224,747), dated Oct. 22, 2008.
European Patent Office, European Search Report for European Patent Application No. 06251708 (related to co-pending U.S. Appl. No. 14/224,747), dated Aug. 14, 2006.
Japan Patent Office, Notice of Decision of Final Rejection for Japanese Patent Application No. 2008-321973, (related to co-pending U.S. Appl. No. 14/224,747), mailed Feb. 8, 2011.
Japan Patent Office, Notice of Reasons for Rejection for Japanese Patent Application No. 2008-321973 (related to co-pending U.S. Appl. No. 14/224,747), mailed Sep. 14, 2010.
Japan Patent Office, Notice of Reasons for Rejection for Japanese Patent Application No. 2010-254705 (related to co-pending U.S. Appl. No. 14/224,747), mailed Apr. 10, 2012.
Japan Patent Office, Notice of Reasons for Rejection for Japanese Patent Application No. 2013-162115 (related to co-pending U.S. Appl. No. 14/224,747), mailed May 13, 2014.
Japan Patent Office, Notice of Reasons for Rejection for Japanese Patent Application No. 2013-180936 (related to co-pending U.S. Appl. No. 14/224,747), mailed Jun. 3, 2014.
Japan Patent Office, Decision of Final Rejection for Japanese Patent Application No. 2013-162115 (related to co-pending U.S. Appl. No. 14/224,747), mailed Oct. 21, 2014.
State Intellectual Property Office of the People'S Republic of China, Notification of First Office Action issued for Chinese Patent Application No. 201310172864.7 (foreign counterpart of above-captioned patent application), mailed Apr. 8, 2015.

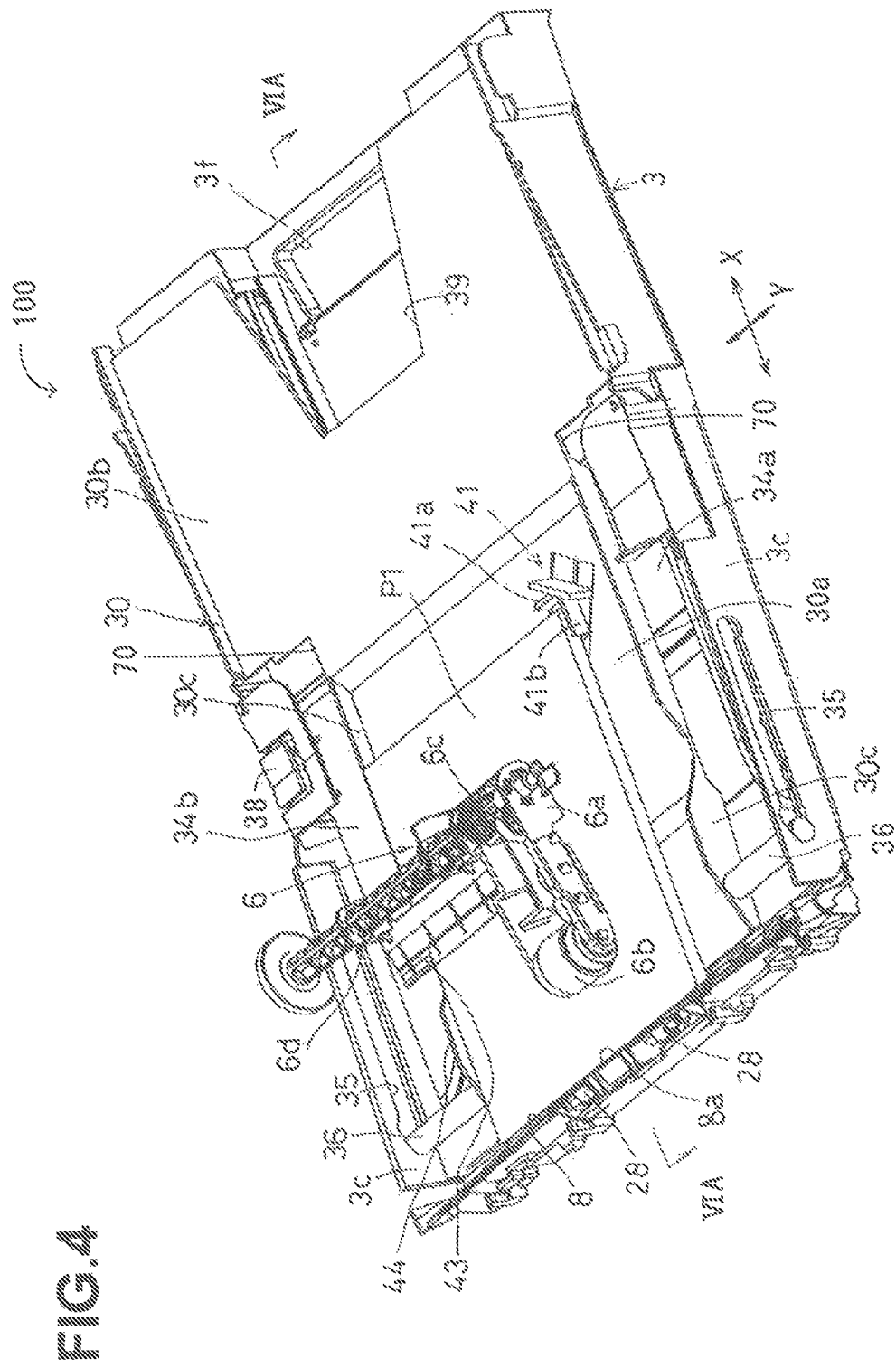

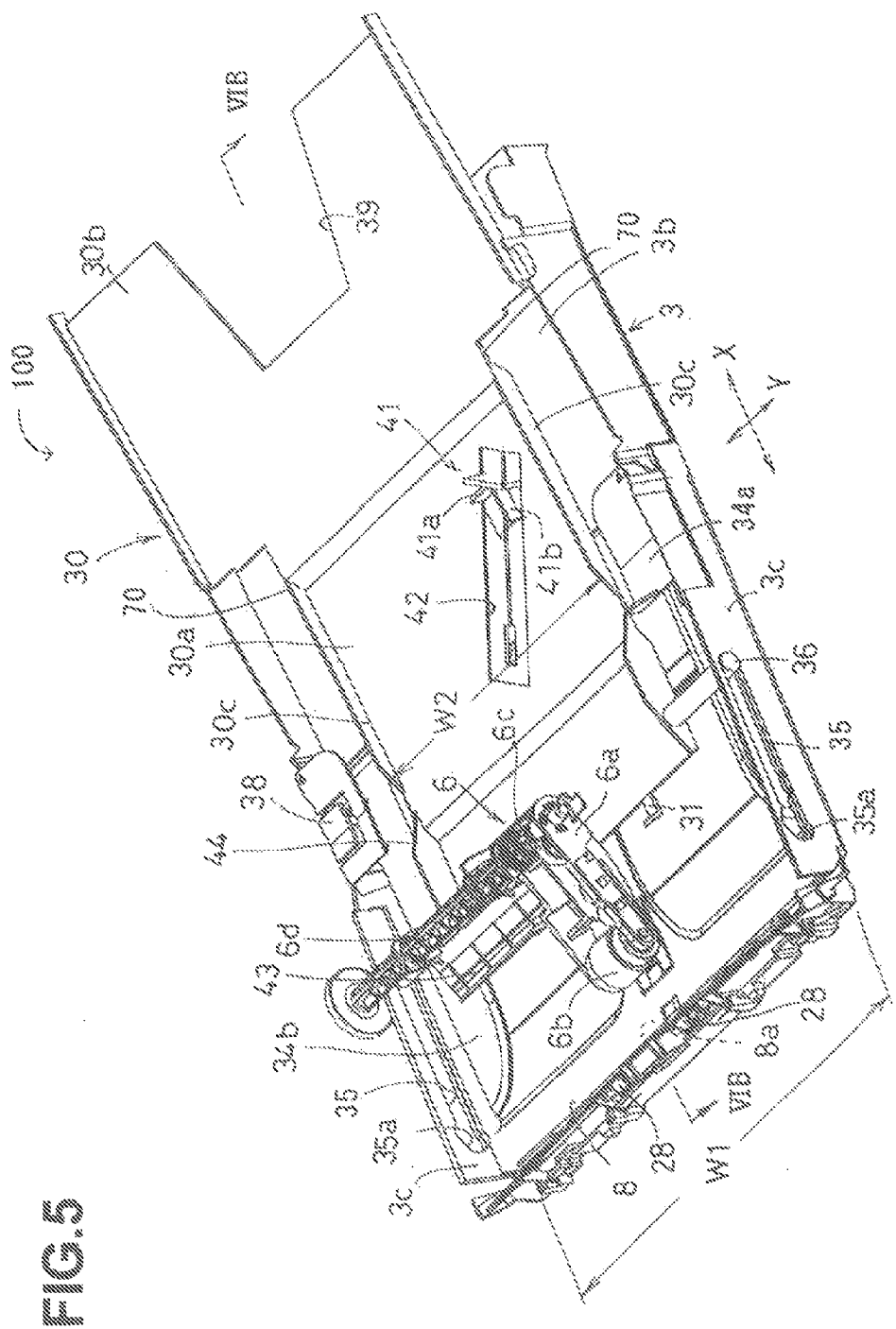

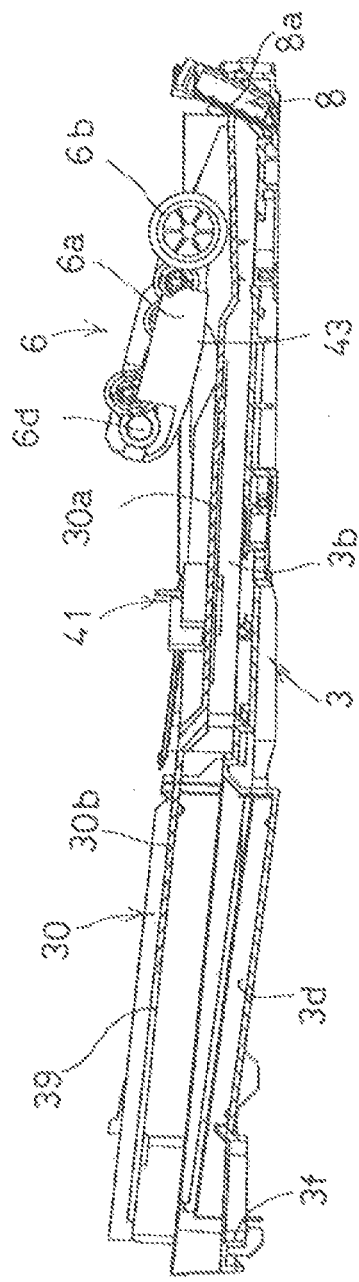

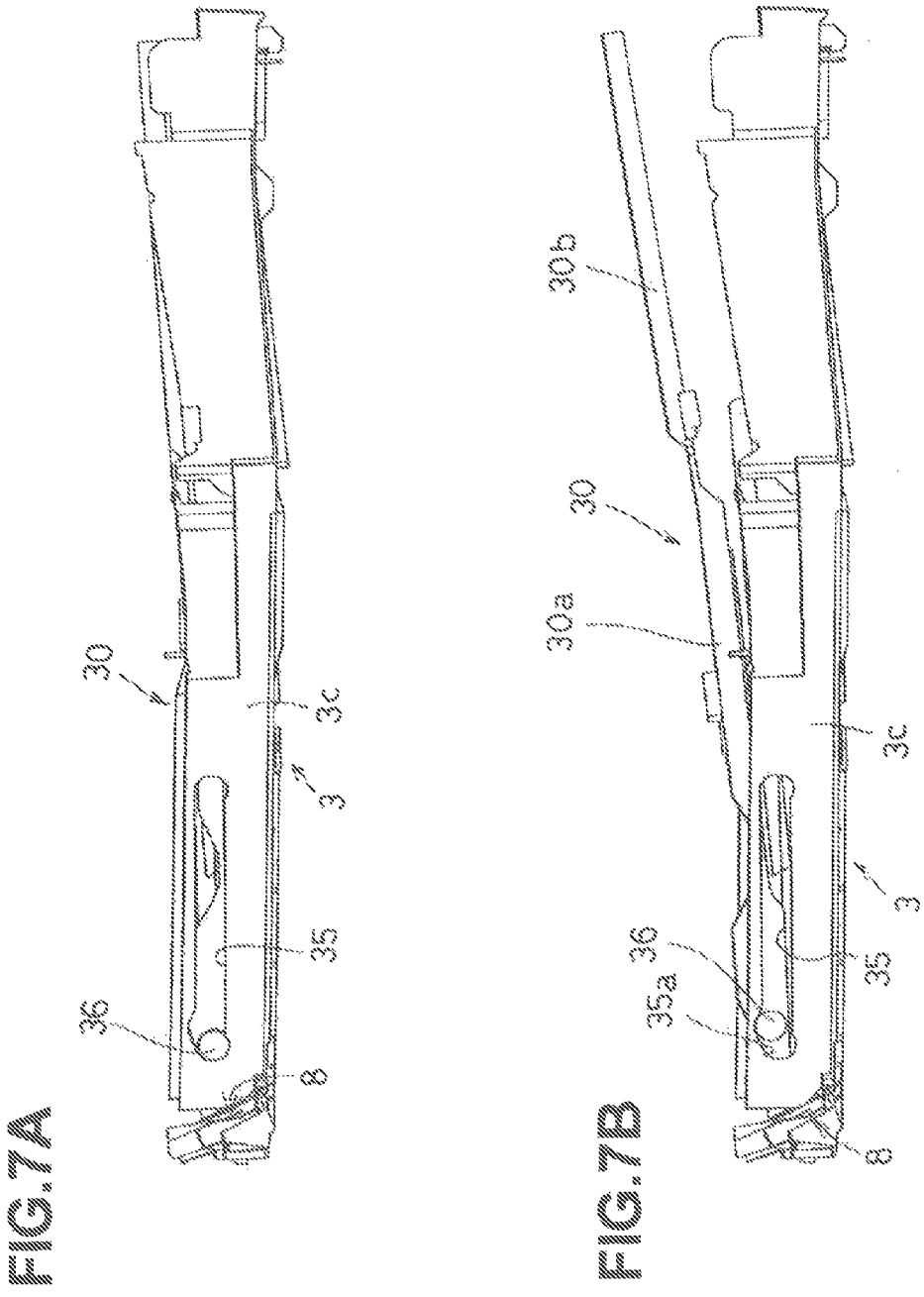

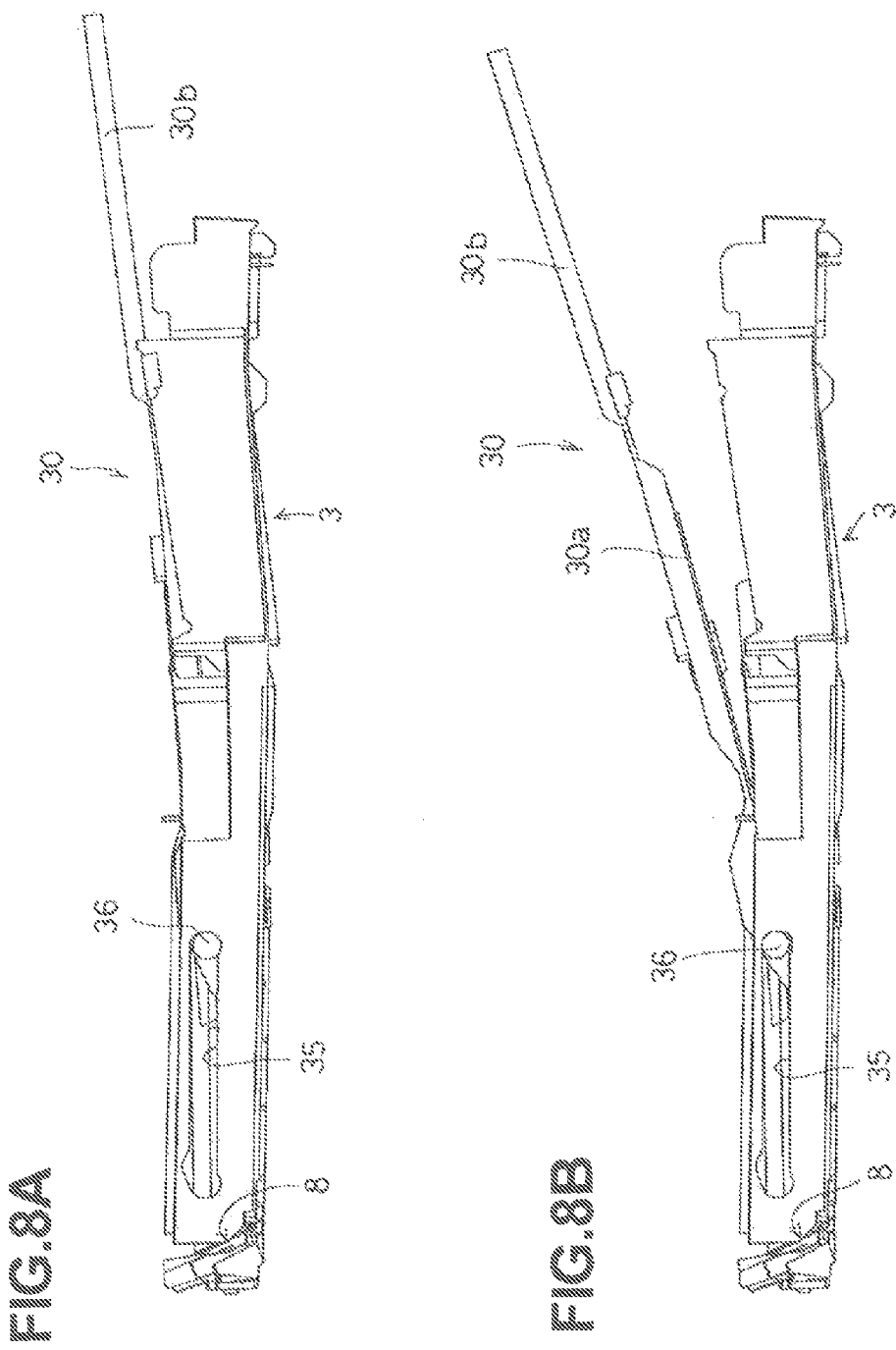

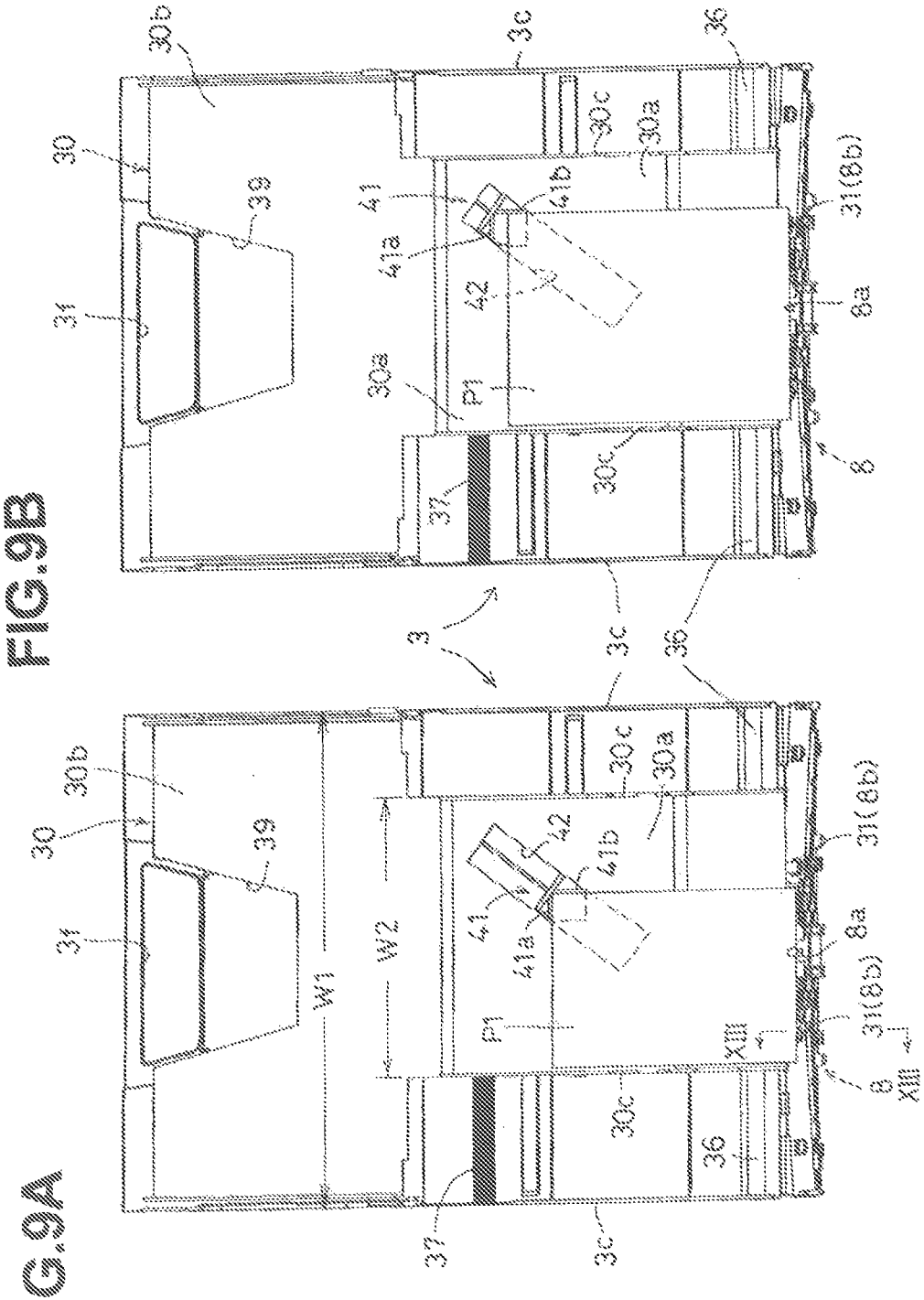

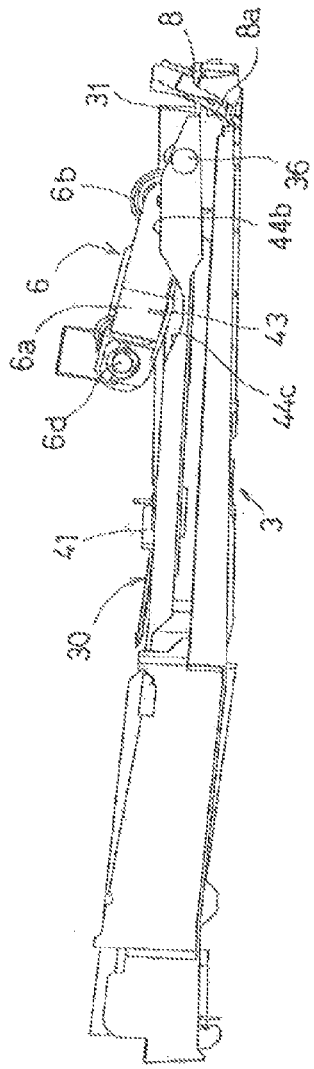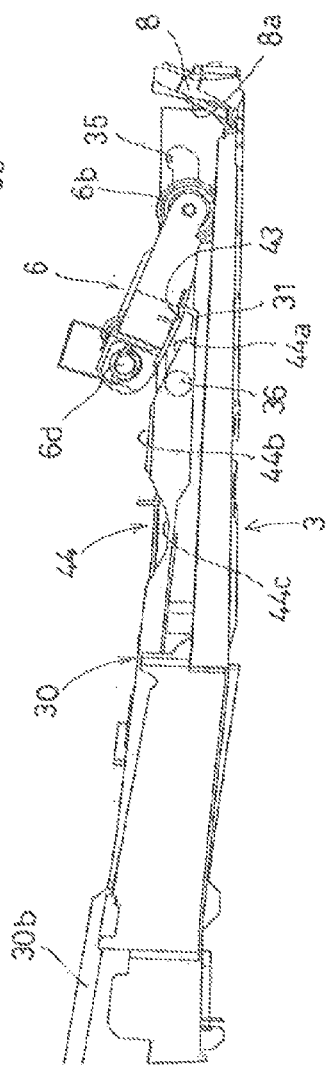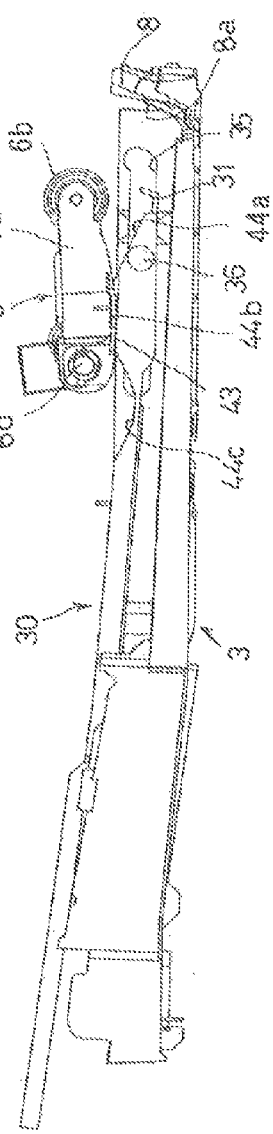
FIG.14A
FIG.14B
FIG.14C

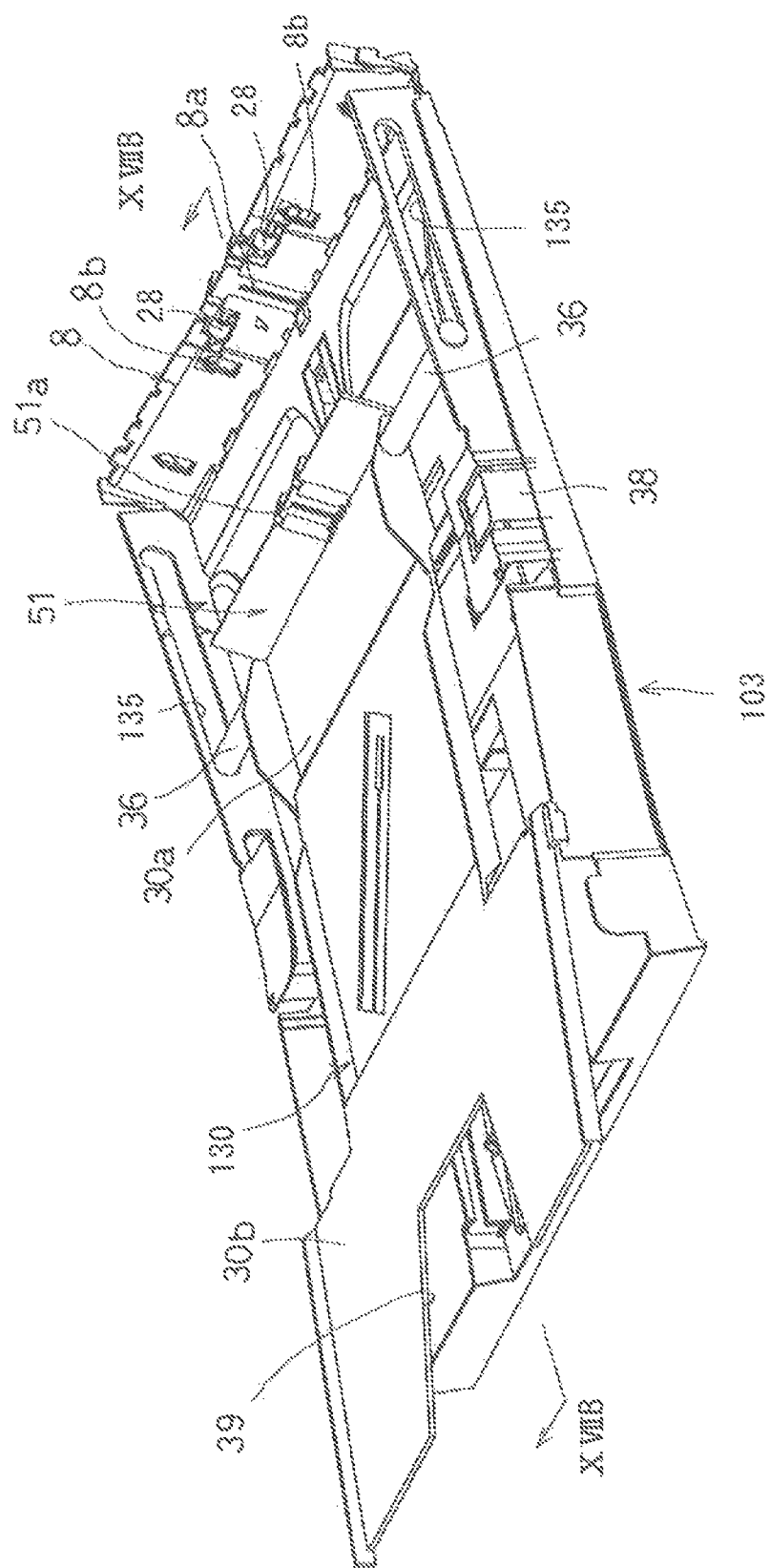

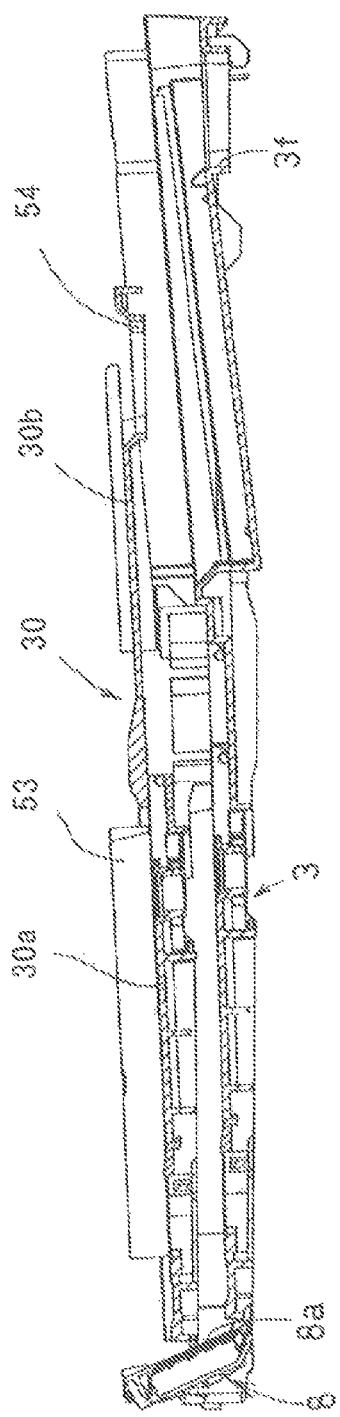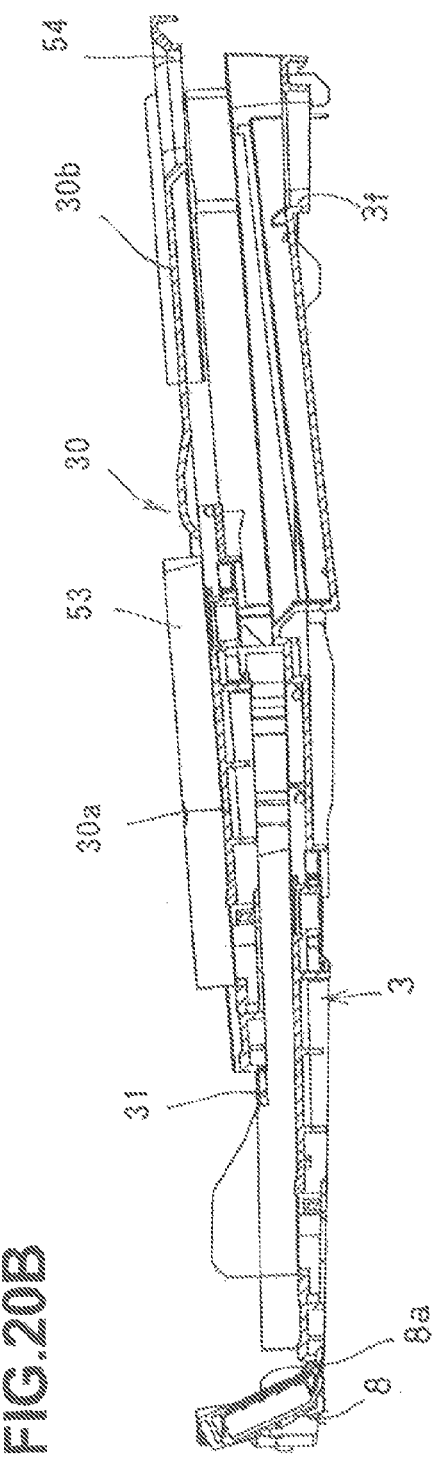

SHEET FEED DEVICE AND IMAGE RECORDING APPARATUS HAVING SUCH SHEET FEED DEVICE

CROSS REFERENCE TO RELATED APPLICATIONS

The present application is a continuation of U.S. Pat. application Ser. No. 14/224,747, filed on Mar. 25, 2014, which is a continuation of U.S. Pat. application Ser. No. 13/429,067, filed on Mar. 23, 2012, now U.S. Pat. No. 8,714,540 B2, issued on May, 6, 2014, which is a continuation of U.S. Pat. application Ser. No. 13/111,781, filed on May 19, 2011, now U.S. Pat. No. 8,342,503 B2, issued on Jan. 1, 2013, which is a continuation of U.S. Pat. application Ser. No. 12/603,628, filed on Oct. 22, 2009, now U.S. Pat. No. 7,963,517 B2, issued on Jun. 21, 2011, which is a divisional of U.S. Pat. application Ser. No. 11/277,624, filed on Mar. 28, 2006, now U.S. Pat. No. 7,694,950 B2, issued on Apr. 13, 2010, which claims priority from Japanese Patent Application Nos. 2005-99607, 2005-99608, 2005-99609, and 2005-99610, each of which were filed on Mar. 30, 2005, the disclosures of which are incorporated herein by reference in their entirety.

BACKGROUND OF THE INVENTION

1. Field of the Invention

The present invention relates generally to a sheet feed device that includes a first sheet cassette and a second sheet cassette disposed on the first sheet cassette, and selectively feeds sheets (recording media) that are positioned in the first sheet cassette or sheets that are positioned in the second sheet cassette and are different than, e.g., smaller than, the sheets in the first sheet cassette. The present invention also relates to an image recording apparatus having such a sheet feed device.

2. Description of Related Art

A sheet feed device used in a known image recording apparatus, such as a printer and/or a facsimile machine, is disclosed, for example, in Japanese Laid-Open Utility Model Publication No. 6-49439. In this known sheet feed device, the sheet cassette for accommodating a stack of recording media (such as recording sheets and cut sheets) is disposed in a lower side of the apparatus body (housing). A cover member covering a rear half of the sheet cassette is provided with a pair of guide holes elongated in the sheet feed direction, and the cover member is further provided on its upper surface with a pair of regulation plates for positioning the right and left sides of a manually fed sheet. A partition plate is disposed in an accommodating portion of the sheet cassette so as to divide a front opening into upper and lower spaces. A pair of levers projecting from the upper surface of a rear portion of the partition plate are fitted loosely in the pair of guide holes. A sheet feed roller is disposed above the front opening of the sheet cassette. With this device for recording an image on a manually fed sheet, a sheet is placed at a predetermined position of the partition plate, and the partition plate is moved forward so that its upper front portion is placed below the sheet feed roller. Thus, the sheet may be fed by the sheet feed roller. On the other hand, when the partition plate is moved backwards, the sheets stacked in the sheet cassette are fed one by one by the sheet feed roller in cooperation with a pair of separation pieces provided near the front corners of the sheet cassette.

Another sheet feeding device is disclosed in Japanese Laid-Open Patent Publication No. 11-59925. In this known sheet feed device, a sheet feed roller is disposed above the front end of a first sheet cassette. The first sheet feed cassette has a plate-like cassette base on which a stack of sheets are placed, and the cassette base is pushed up towards the sheet feed roller by a coil spring provided at the lower front portion of the cassette base. The cassette base is disposed between a pair of side regulation plates that are movable to contact and to position the right and left sides of the sheets in the first cassette. A plate-like second sheet cassette is detachably attached onto the cassette base. The second sheet cassette has fixed side regulation plates and a fixed rear end regulation plate that contact and position the sheets in the second sheet cassette. The sheets in the second sheet cassette are smaller in size than those in the first sheet cassette.

However, in the sheet feed device disclosed in Japanese Laid-Open Utility Model Publication No. 6-49439, because the partition plate does not include any separation pieces for separating one manually fed sheet from the other manually fed sheets, only a single, smaller-sized sheet, such as a postcard, is allowed to be placed on the partition plate. Consequently, in order to record an image on a plurality of postcards, it is necessary for the user to place one postcard at a time on the partition plate, and to move the partition plate back and forth, which is burdensome to the user.

Moreover, in the sheet feed device disclosed in Japanese Laid-Open Patent Publication No. 11-59925, although a plurality of smaller sized-sheets may be accommodated in the second sheet cassette, the second sheet cassette must be detached from the first sheet cassette when image recording is performed on larger-sized sheets. For example, when trial recording is performed on a plain sheet in the first cassette, in order to check the position and color conditions of a recorded image before actual recording on a postcard, the second sheet cassette must be detached from the first sheet cassette and then reattached to the first sheet cassette. In other words, it is not possible to feed sheets in the first sheet cassette that are different in size from those feed sheets in the second sheet cassette, in a state where the second sheet cassette is set in the first sheet cassette. Consequently, the user must attach and detach the second sheet cassette each time that the sheets to be used are switched, which is burdensome to the user.

SUMMARY OF THE INVENTION

Therefore, a need has arisen for sheet feed devices that overcome these and other shortcomings of the related art. A technical advantage of the present invention is that the sheet feed device is relatively simple in structure, and can selectively feed different types of sheets, e.g., sheets having different sizes, from two sheet cassettes while reducing user interaction with operating the sheet cassettes.

According to an embodiment of the invention, a sheet feed device comprises a first sheet cassette comprising an accommodating portion configured to accommodate a first plurality of sheets, and a second sheet cassette disposed on the first sheet cassette and configured to accommodate a second plurality of sheets, in which at least one characteristic of the first plurality of sheets is different than at least one characteristic of the second plurality of sheets. The sheet feed device also comprises a sheet feeder configured to feed the first plurality of sheets and the second plurality of sheets in a sheet feed direction toward a recording unit, and a sheet separator configured to separate, one by one, the sheets fed by the sheet feeder. Specifically, the second sheet cassette is configured to move above the accommodating portion and with respect to the sheet feeder from a first position to a second position and from the second position to the first position, and the sheet feeder selectively feeds the first plurality of sheets and the second plurality of sheets. In this sheet feed device, different types of sheets or different sized sheets, or both, may be selectively fed.

According to another embodiment of the present invention, the above-described sheet feed device may be incorporated into an image recording apparatus. The image recording apparatus comprises a housing, a recording unit that records an image on a sheet, and a sheet feed path through which the sheet is fed to the recording unit. The recording unit, the sheet feed path, and the sheet feeder of the sheet feed device are accommodated in the housing. The first and second sheet cassettes of the sheet feed device are disposed at a lower position than the recording unit, and may be moved inward and outward with respect to the housing.

In this image recording apparatus, sheets may be readily reloaded in the first and the second sheet cassettes by moving the first and the second sheet cassettes outward with respect to the housing.

Other advantages of the present invention will be apparent to persons of ordinary skill in the art in view of the following detailed description of the invention and the accompanying drawings.

BRIEF DESCRIPTION OF THE DRAWINGS

For a more complete understanding of the present invention, and the needs satisfied thereby, reference now is made to the following descriptions taken in connection with the accompanying drawings.

FIG. 4 is a perspective view of a sheet feed device according to a first embodiment of the present invention, in which a second sheet cassette is set at a sheet feed position on a first sheet cassette.

FIG. 5 is a perspective view of the sheet feed device in which the second sheet cassette is moved back to a non-sheet-feed position.

FIG. 6A is a cross-sectional view of the sheet feed device taken along line VIA-VIA of FIG. 4.

FIG. 6B is a cross-sectional view of the sheet feed device taken along line VIB-VIB of FIG. 5.

FIG. 7A is a left side view of the sheet feed device of FIG. 4.

FIG. 7B is a left side view of the sheet feed device in which an upstream portion, as seen in the sheet feed direction, of the second sheet cassette in the sheet feed position is raised.

FIG. 8A is a left side view of the sheet feed device of FIG. 5.

FIG. 8B is a left side view of the sheet feed device in which an upstream portion, as seen in the sheet feed direction, of the second sheet cassette in the non-sheet-feed position is raised.

FIG. 9A is a plan view showing a state where a slant (rear corner) guide is used in the second sheet cassette.

FIG. 9B is a plan view showing another state where the slant guide is used in the second sheet cassette.

FIG. 14A is a side view of a cam follower of a sheet feeder and a cam of the second sheet cassette in a state shown in FIG. 4.

FIG. 14B is a side view of the cam follower of the sheet feeder and the cam of the second sheet cassette in a state shown in FIG. 5.

FIG. 14C is a side view of the cam follower of the sheet feeder and the cam of the second sheet cassette when the second sheet cassette is between the sheet feed position and the non-sheet-feed position.

FIG. 16 is a perspective view of the modified first and second sheet cassettes, where the second sheet cassette is moved back to the non-sheet-feed position on the first sheet cassette.

FIG. 20A is a cross-sectional view of the first and second sheet cassettes taken along line XXA of FIG. 18.

FIG. 20B is a cross-sectional view of the first and second sheet cassettes taken along line XXB-XXB of FIG. 19.

DETAILED DESCRIPTION OF THE PREFERRED EMBODIMENTS

Preferred embodiments of the present invention may be understood by referring to FIGS. 1-29D, like numerals being used for like corresponding parts in the various drawings.

Figure 1:
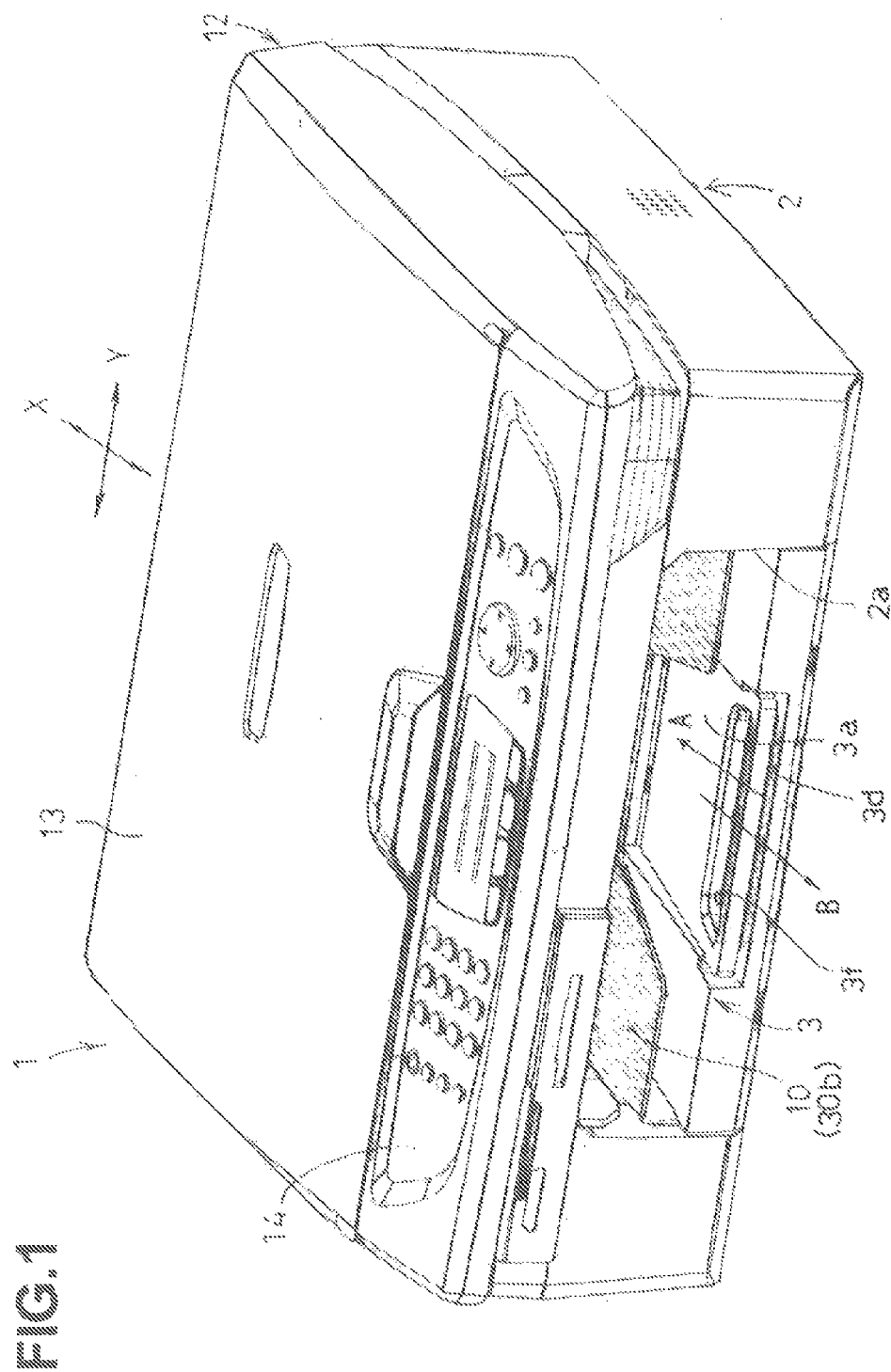
FIG. 1 is a perspective view of an image recording apparatus.
Figure 2:
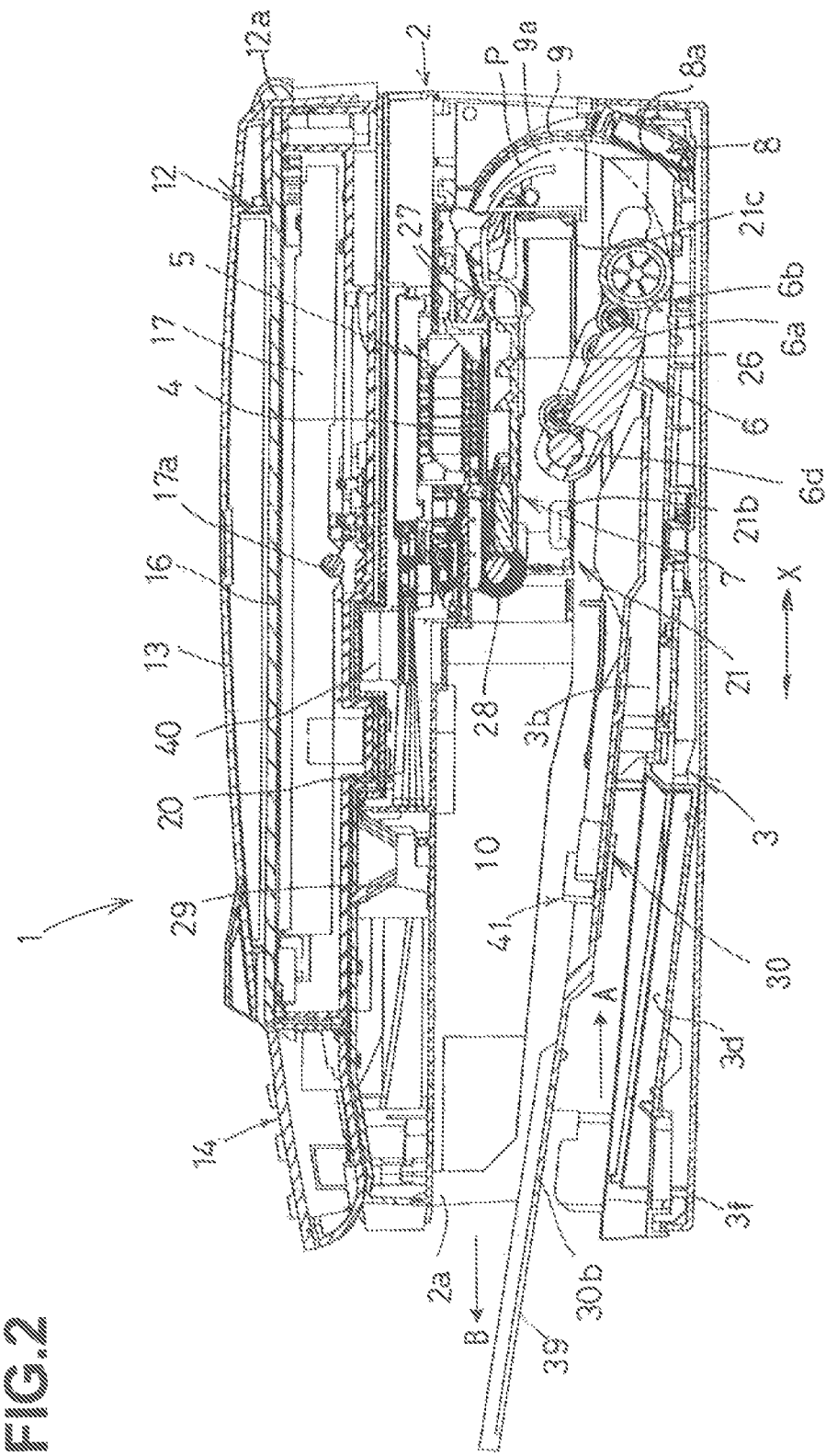
FIG. 2 is a side crossectional view of the image recording apparatus.

FIG. 1 shows an image recording apparatus 1 according to an embodiment of the present invention. Image recording apparatus may be a multi-function device (MFD) that has printing, copying, scanning, and facsimile functions. As shown in FIGS. 1 and 2, image recording apparatus 1 may have a housing 2 as a main body of the apparatus. Housing 2 may be formed by injection-molding of a synthetic resin material. A first sheet cassette 3, which can be inserted from an opening 2a at the front of housing 2 (on the left in FIG. 2), may be disposed at the bottom of housing 2. A second sheet cassette 30 may be movably connected to or placed on an upper surface of first sheet cassette 3. Hereinafter, a side on which opening 2a is located is referred to as a "front" side of image recording apparatus 1, and a side opposite from opening 2a is referred to as a "rear" side of image recording apparatus 1.

On an upper portion of housing 2, an image reading device 12 may be disposed for reading a document during the copying and facsimile operation of image recording apparatus 1. Image reading device 12 may be arranged to be pivotable upward and downward about one end of housing 2 via hinges (not shown). A document cover member 13 may be connected at its rear end to a rear end of image reading device 12 via hinges 12a so as to be pivotable upward and downward about hinges 12a.

An operation panel 14 provided with various operation buttons and a liquid crystal display may be disposed on an upper side of housing 2, on a front side of image reading device 12. A glass plate 16 may be provided at or on an upper surface of image reading device 12. A document may be placed on glass plate 16 by opening document cover member 13 in a upward direction. Below glass plate 16, an image scanning device (CIS: Contact Image Sensor) for reading an image on the document may be provided so as to be reciprocally movable along a guide shaft 17a that extends in a direction perpendicular to a sheet plane of FIG. 2 (a main scanning direction or a Y-axis direction in FIGS. 1, 2 and 3).

Below image reading device 12 and operation panel 14, a recording unit 7, a sheet discharge portion 10, and an ink storage portion 15 disposed on one side of sheet discharge portion 10 may be located within a projected area of image reading device 1 and operation panel 14.

Figure 3:
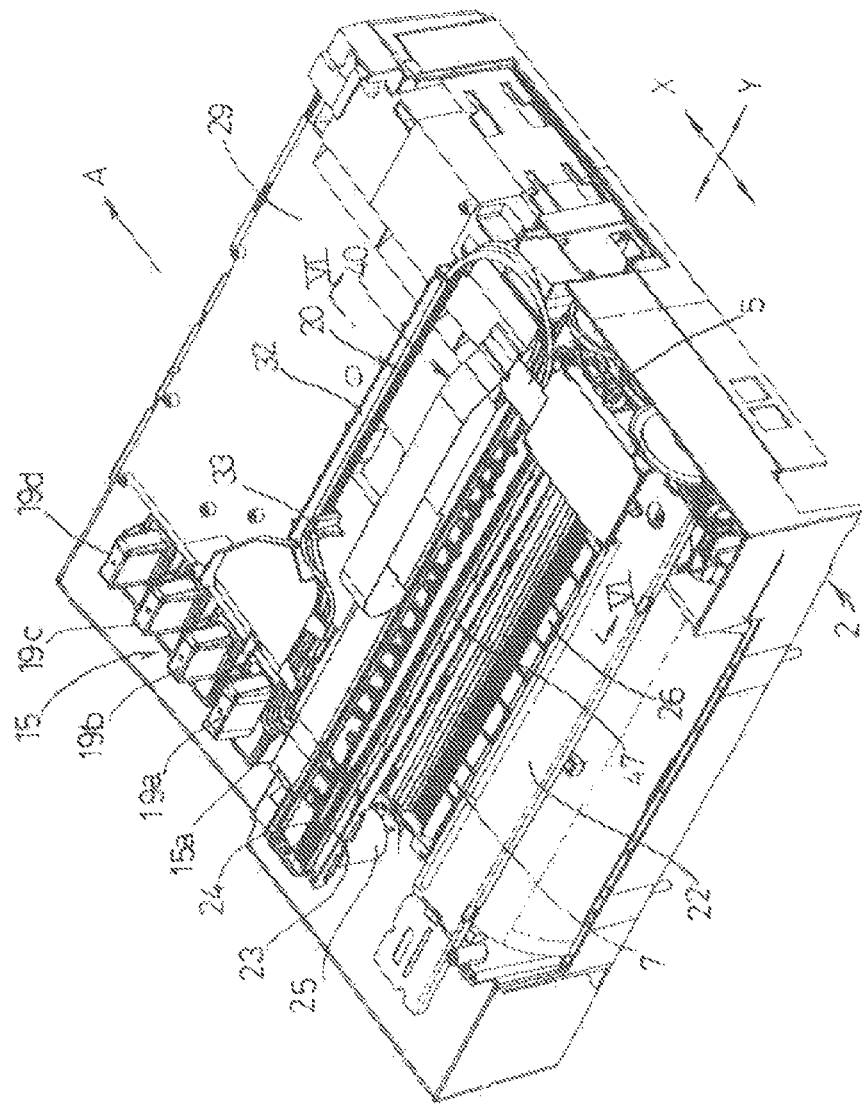
FIG. 3 is a perspective view of a recording device exposed when an image reading device is removed.

As shown in FIGS. 2 and 3, recording unit 7 may be defined by a main frame 21 having an upwardly open box structure, and a first guide member 22 and a second guide member 23 that comprise elongate plates supported by side plates of main frame 21 and extend in the Y-axis direction (main scanning direction). A carriage 5, on which a recording head 4 of recording unit 7 may be mounted may be supported by first guide member 22 located upstream of carriage 5 as seen in a sheet discharge direction (indicated by arrow B) the second guide member 23 located downstream of carriage S so as to be slidably movable on first guide member 22 and second guide member 23. Thus, carriage 5 may be reciprocally movable in the Y-axis direction.

In order to reciprocally move carriage 5, a timing belt 23 may be disposed on an upper surface of the second guide member 23 as seen in the sheet discharge direction. Timing belt 24 extends in the main scanning direction (Y-axis direction) and is wound around pulleys. A carriage motor 25 (FIG. 3) to drive timing belt 24 may be fixed to a lower surface of second guide member 23. Carriage motor 25 may be a DC motor, a stepping motor, or the like. Second guide member 23 may be provided with an encoder strip 47 that extends in the main scanning direction and detects the position of carriage 5 in the Y-axis direction (main scanning direction). Encoder strip 47 may be belt-shaped, and a detecting surface of encoder strip 47 may be formed with slits at regular intervals in the Y-axis direction and may be disposed along a vertical direction.

A platen 26 may have a flat shape and may extend in the Y-axis direction so as to face an underside of recording head 4 on carriage 5. Platen 26 may be fixed above a bottom plate 21b of main frame 21 between first guide member 22 and second guide member 23.

As shown in FIGS. 2 and 3, a partition plate 29, e.g., a plate made of a synthetic resin, may be formed integrally with housing 2 so as to extend from a lower surface of second guide member 23 to opening 2a (used also as a sheet-discharge opening) at the front end of housing 2 to cover sheet discharge portion 10.

Ink storage portion 15 may be open upward of housing 2, and may accommodate, for full-color recording, ink cartridges 19 (black, cyan, magenta, and yellow ink cartridges 19a-19d in FIG. 31 which may be detachably attached from above to ink storage portion 15 in a row along the X-axis direction. Each of ink cartridges 19 may have a rectangular box shape and may have a relatively small area (as seen in plan view) and a relatively large height.

Ink may be supplied from ink cartridges 19a-19d to inkjet-type recording head 4 though a plurality of ink tubes 20, e.g., (four ink tubes). When more than four ink colors are used e.g., 6 to 8 ink colors, ink storage portion 15 may be designed to accommodate ink cartridges corresponding in number to the number of ink colors, and ink tubes 20 may be increased in number corresponding to the number of ink cartridges.

As shown in FIG. 3, root portions of the plurality of ink tubes 20 may be connected to one end 15a of ink storage portion 15, and may extend from one side (left side in FIG. 3) to the other side (right side in FIG. 3) along the Y-axis direction. The root portions of ink tubes 20 may be arranged horizontally in a row along an upper surface of partition plate 29, which may be substantially horizontal. At least one portion, e.g., intermediate portions, of ink tubes 20 may be supported by the upper surface of partition plate 29.

Then, ink tubes 20 may be twisted, e.g., at their middle portions, to extend along a vertical side surface of a laterally elongated upright partition plate 32 of partition plate 29, and may be secured, e.g., held or sandwiched, in a row vertically between the vertical side surface of upright partition plate 32 and a holder 33, which may be made of a synthetic resin, into a vertical plate and fixed with a screw or the like to face the vertical side surface. Holder 33 and upright partition plate 32 serve as an intermediate holder to secure (hold) ink tubes 20.

An ink receiver (not shown) may be disposed at one side of recording unit 7 at the outside of the width (shorter side) of a sheet P to be fed, and a maintenance 26 unit (not shown)

may be disposed at the other side thereof. The ink receiver receives the ink ejected from recording head 4 when ink ejection is performed periodically to prevent the nozzle from clogging during recording operation at a flashing position provided to face the ink receiver. The maintenance unit performs maintenance of recording head 4 when carriage 5 is at a stand-by position. The maintenance unit covers the nozzle surface of recording head 4 from the bottom with its cap portion (not shown) and selectively sucks each color ink or eliminates air bubbles from a buffer tank (not shown) above recording head 4. When carriage 5 moves sideways toward the maintenance unit, a cleaner (wiper blade) wipes the nozzle surface.

As shown in FIG. 3, according to one embodiment of the present invention, a flexible flat cable 40, which transfers command signals for selective ink ejection from the nozzles of recording head 4 from a control portion provided in housing 2 to recording bead 4, may be arranged substantially in parallel with the extending direction of ink tubes 20, at an area where ink tubes 20 pass when carriage 5 moves reciprocally in the Y-axis direction, i.e., at a movable or non-bundled area of ink tubes 20.

Intermediate bent portions of ink tubes 20 and an intermediate bent portion of flexible flat cable 40 may protrude in opposite directions with respect to the reciprocally moving direction of carriage 4. This arrangement allows ink tubes 20 and flexible flat cable 40 to be located at substantially the same height in the vertical direction, that is, on a substantially same horizontal plane. Thus, image recording apparatus may be relatively thin.

As shown in FIG. 2, a pair of register rollers (transport rollers) may be disposed upstream of the platen 26 as seen in the sheet discharge direction to feed the sheet P to the underside of recording head 4, and a discharge roller 28 may be disposed downstream of platen 26 to discharge the printed sheet P to sheet discharge portion 10.

The structure of a sheet feed device 100 according to a first embodiment of the present invention will now be described. In this embodiment, sheet feed device 100 comprises a first sheet cassette 3 and a second sheet cassette 30. First sheet cassette 3 has an accommodating portion 3b configured to accommodate a stack of sheets. P, and sheets P in accommodating portion 3b may be fed in a sheet feed direction (indicated by arrow A) toward recording unit 7 one by one by a sheet feeder 6. Second sheet cassette 30 may be disposed above accommodating portion 3b and may be movable back and forth with respect to sheet feeder 6. Second sheet cassette 30 may be configured to accommodate a stack of sheets P1 that are different in size from the sheets P accommodated in first sheet cassette 3, e.g., sheets P1 may be smaller-sized sheets, such as postcards and L-sized photograph sheets. The sheets P1 in second sheet cassette 30 may be fed in the same direction as the feed direction of the sheets P. When second sheet cassette 30 is moved back (pulled back) with respect to first sheet cassette 3 in a direction opposite to the sheet feed direction, that is, in the sheet discharge direction, an upstream end of second sheet cassette 30 is positioned behind (upstream of) an upstream end of first sheet cassette 3 as seen in the sheet feed direction.

As shown in FIGS. 2, 4 and 5, a drive shaft 6d made of a synthetic resin may be rotatably supported by shaft holes formed in a side plate (not shown) and a pair of shaft supporting plates (not shown) of main frame 21. Drive shaft 6d may be inserted into the shaft holes, such that an end of drive shaft 6d projects sideways from a base portion of a sheet feed arm 6a. When drive shaft 6d is driven to rotate, sheet feed roller 6b may rotate in a predetermined direction (counterclockwise direction in FIG. 2) via a gear transmission mechanism 6c provided in sheet feed arm 6a. Sheet feed roller 6b may be urged downward by an urging member, e.g. a torsion spring (not shown).

First sheet cassette 3 may be configured to accommodate a stack of larger cut sheets P, such as A4-sized sheets, letter-sized sheets, and legal-sized sheets, such that a shorter side of the cut sheet P extends in the Y-axis direction (main scanning direction). In this embodiment of the present invention, the maximum capacity of the accommodating portion 3b of the first sheet cassette 3 may be about 100 sheets of plain paper, or a stack having a height (H1) of about 10 mm. As shown in FIG. 1, an auxiliary support member 3a may be provided movably in the sheet feed direction (sub scanning direction or X-axis direction) in a recess 3d at an upstream end of first sheet cassette 3 as seen in the sheet feed direction (at a front side of housing 2) to support the trailing edges of longer sheets, such as legal-sized sheets. As shown in FIGS. 1, 4, 9A, and 9B, a trapezoidal hole may be formed near the upstream end of auxiliary support member 3a to provide a grip 3f with which first sheet cassette 3 can be readily inserted and removed through opening 2a of housing 2.

A main inclined separation plate 8 for separating one sheet from the others may be disposed at a downstream end (on the right side in FIG. 2) of first sheet cassette 3 as seen in the sheet feed direction. The sheets P stacked in first sheet cassette 3 are separated one by one by the sheet feed roller 6b and an elastic separation pad 8a (formed by a metal spring in this embodiment) provided on an inner surface and at the center in the width direction (Y-axis direction) of inclined separation plate 8. The separated sheet P is fed, via a sheet feed path member 9 that defines a U-turn path (sheet feed path) 9a extending upward, to recording unit 7 located at a higher position than first sheet cassette 3. Then, the sheet P recorded thereon by recording unit 7 may be discharged to discharge portion 10 communicating with opening 2a, with the recorded surface facing upward.

As shown in FIGS. 4 and 9, main inclined separation plate 8 may have a curved surface such that, as seen in a direction perpendicular to the sheet feed direction, a portion near elastic separation pad 8a in the form of a sawtooth is closer to the widthwise center of a leading edge of the sheet P and is more remote from the widthwise ends of the leading edge of the sheet P. Thus, before the leading edge of the sheet P comes into contact with main inclined separation plate 8 at the widthwise ends, the leading edge of the sheet P comes in sliding contact with elastic separation pad 8a at the widthwise center, and thereby the sheet P is reliably separated. As shown in FIGS. 4 and 5, freely rotatable rollers 28 may be provided adjacent to an upper end of main inclined separation plate 8 on both sides of elastic separation pad 8a to guide the sheet P smoothly to sheet feed path member 9. Main inclined separation plate 8 may be detachably attached to the downstream end of first sheet cassette 3 as seen in the sheet feed direction.

A pair of left and right side guides 34a, 34b, respectively, may be provided in accommodating portion 3b of first sheet cassette 3, as a guide unit, and may be movable in a direction perpendicular to the sheet feed direction to position and guide the sheet side edges in parallel with the sheet feed direction. The pair of side guides 34a, 34b may be slidable, such that the distance therebetween is widened or narrowed. Racks (not shown) connected to the bottoms of the pair of side guides 34a, 34b, respectively, may be engaged with a pinion gear located at a center line of the width (in a direction perpendicular to the sheet feed direction) of the bottom plate of first sheet cassette 1. Thus, the sheets P are centered in first sheet cassette 3, that is, the widthwise center line of the sheets P corresponds with the widthwise center line of first sheet cassettes P. At least one of the side guides 34*a* may be provided with a handle 38 (FIGS. 4 and 5) that is engaged with and held at a rack-shaped engaging portion 37 (FIGS. 9A and 9B) formed on an upper surface of first sheet cassette 3.

Second sheet cassette 30 according to the first embodiment of the present invention may comprise a bottom plate 30*a* provided on a downstream side, and a sheet receiver 30*b* formed integrally with the bottom plate 30*a* and provided on an upstream side as seen in the sheet feed direction. The bottom plate 30*a* may have a substantially rectangular shape as seen in plan view, and holds, as a holding portion, a stack of sheets. On bottom plate (holding portion) 30*a*, smaller sheets P than those sheets stacked in first sheet cassette 3, such as postcards and L-sized photograph sheets, may be stacked. Moreover, not only may sheets having a different size be employed, but also sheets of a different type than those sheets stacked in the first sheet cassette 3 may be employed. For example, sheets exclusively for inkjet printing and calendared sheets for photograph quality printing may be stacked on the bottom plate (holding portion) 30*a*.

The width W2 of bottom plate 30*a* may be smaller than the width W1 of first sheet cassette 3, and bottom plate 30*a* may be placed at a central portion in the width direction of first sheet cassette 3. Cutouts 70 may be provided in bottom plate 30, such that one end of bottom plate 30*a* is narrower in width. This structure allows the user to readily access handle 38 of side guide 34*b* without removing second sheet cassette 30, and facilitates widthwise positioning of the sheets P in first sheet cassette 3. Sheet receiver 30*b* may be formed integrally with bottom plate 30*a* and may have a continuously wide width from bottom plate 30*a*, which is substantially equal to width of the first sheet cassette 30. As shown in FIGS. 4, 5, 6A, 6B, 9A, and 9B, sheet receiver 30*b* may be formed with a cutout 39 open toward the front of image recording apparatus 1 to facilitate allowing the user to pinch the edge of the sheet P (P1) with their fingers.

Because sheet receiver 30*b* is connected to bottom plate 30*a* via a step, such that sheet receiver 30*b* is elevated higher than bottom plate 30*a*, the sheets P (P1) recorded thereon and discharged from recording unit 7 are likely to pass over the blank sheets P (P1) stacked on bottom plate 30*a* and reach sheet receiver 30*b*.

Second sheet cassette 30 may be connected to first sheet cassette 3 and may be movable back and forth along the sheet feed direction and pivotable upward at its upstream end as seen in the sheet feed direction. More specifically, as shown in FIGS. 4, 5, 7A, 7B, 8A, and 8B, guide holes 35 elongated in the sheet feed direction may be formed in the right and left side plates 3*c* of first sheet cassette 3 that extend in parallel with the sheet feed direction. Round shafts 36 projecting integrally from both sides of a downstream portion (for example, bottom plate 30*a*) of second sheet cassette 30 may be fitted into the respective guide holes 35, such that round shafts 36 are movable in the sheet feed direction and second sheet cassette 30 is pivotable about round shafts 36. The diameter of each of guide holes 35 may be formed, at its downstream end 35*a* as seen in the sheet feed direction, to be relatively large and upwardly inclined. Accordingly, by inclining round shafts 36 with respect to the Y-axis direction, round shafts 36 readily may be inserted into guide holes 35.

Figure 13:
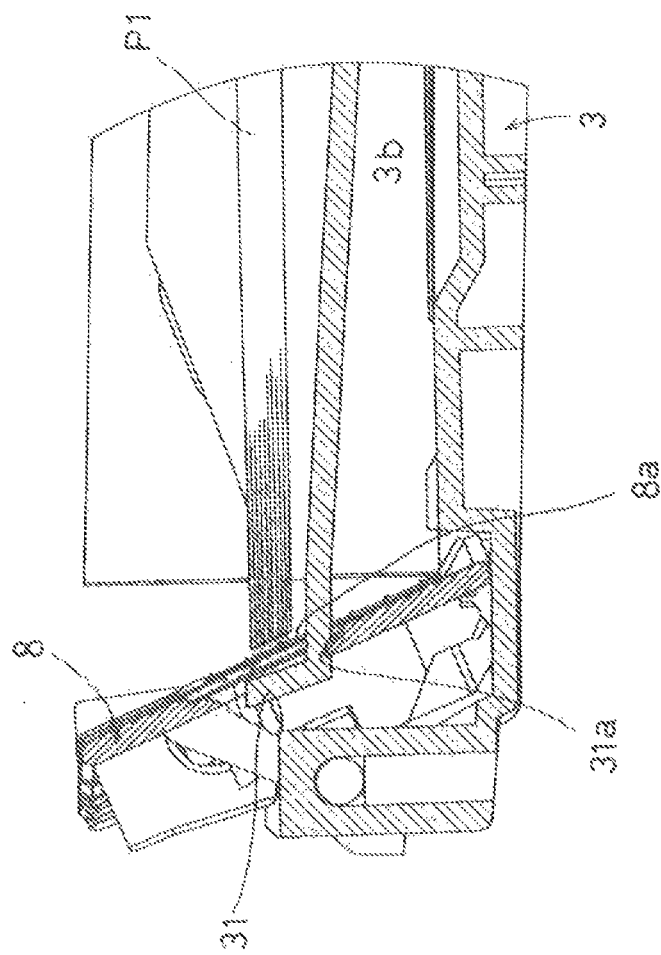
FIG. 13 is a sectional view of the inclined separation plate taken along line XIII-XIII of FIG. 9A.

As shown in FIGS. 5, 6A, 6B, 9A, and 9B, a pair of engaging pieces 31, which may have an upwardly hooked shape, may be formed at a downstream end of bottom plate (holding portion) 30*a* provided on the downstream side of second sheet cassette 30 as seen in the sheet feed direction. When second sheet cassette 30 is pushed to the sheet feed position, the pair of engaging pieces 31 respectively engage a pair of positioning holes 8*b* (FIGS. 9A, 9B, 10A, and 12) formed in main inclined separation panel 8 of first sheet cassette 3. As shown in FIG. 13, engaging piece 31 engages, at a recess 31*a* formed in its lower surface, a lower edge of positioning hole 8*b*, thereby holding second sheet cassette 3 in a state pushed to the sheet feed position not to be displaced in vertical and widthwise directions. Engaging pieces 31 and positioning holes 8*b* may be provided on both sides of elastic separation pad 8*a* at appropriate intervals in the longitudinal direction of main inclined separation panel 8, that is, in the sheet width direction. Thus, when second sheet cassette 30 is set at the sheet feed position with respect to first sheet cassette 3, second sheet cassette 30 may be prevented from being displaced in the vertical direction or in the sheet width direction and from being inclined with respect to the vertical direction. Second sheet cassette 30 may be kept at the sheet feed position to be parallel with the vertical direction and the sheet feed direction, and thus, separation and feeding of the sheets P1 is performed reliably in a stable manner.

Right and left side plates 30*c* of second sheet cassette 30 may be formed integrally with bottom plate 30*a* to extend along the sheet feed direction. A guide unit for positioning the sheets P1 to be parallel with the sheet feed direction may be provided in an intermediate portion on an upper surface of bottom plate 30*a*. As shown in FIGS. 4-9B, the guide unit comprises a slant guide 41 that contacts a rear corner of each sheet P1 and one of side plates 30*c*, as a fixed side guide that guides a side edge of each sheet P1. Slant guide 41 comprises a rear plate 41*a* that contacts the trailing edge of each sheet P1 placed with its one side edge in contact with the one of side plates 30*c*, and a side plate 41*b* that extends in parallel with side plates 30*c* and contacts the other side edge of each sheet P1. Slant guide 41 may be fitted into a guide groove 42 formed slantingly in the bottom plate 30*a*, so as to be movable along guide groove 42.

As shown in FIG. 9A, the slanting degree of guide groove 42 is set such that when the sheet P1 is an L-sized sheet, the sheet P1 contacts at its trailing edge with rear plate 41*a*, and at the same time, at its side edge with side plate 416. When the sheet P1 is a postcard, which is different in the ratio of a longer side and a shorter side from an L-sized sheet, as shown in FIG. 9B, the sheet P1 contacts either at its trailing edge with rear plate 41*a* or at its side edge with side plate 41*b*. The slanting degree of guide groove 42 may be set differently from in FIGS. 9A and 9B, such that when the sheet P1 is a postcard, the sheet P1 contacts at its trailing edge with rear plate 41*a*, and at the same time, at its side edge with side plate 416*b*. In FIGS. 9A and 9B, side guides 34*a*, 34*b* of first sheet cassette 3 are omitted.

When the auxiliary support member 3*a* of first sheet cassette 3 is accommodated in accommodating portion 3*b* and second sheet cassette 30 is pushed to the downstream end of first sheet cassette 3 as seen in the sheet feed direction, the length in the X-axis direction of first sheet cassette 3 and second sheet cassette 30 is substantially equal to the length in the X-axis direction of image reading device 12 and operation panel 14. Image recording apparatus 1 may be a substantially rectangular parallelepiped shape and may be substantially square as seen in plan view. Thus, image recording apparatus 1 easily may be packed for shipment, and a packing box including image recording apparatus 1 may be compact.

First sheet cassette 3 and second sheet cassette 30 may be inserted into and removed from a bottom portion of housing 2 unitarily in a state where second sheet cassette 30 is pushed into the downstream end of first sheet cassette 3 as seen in the sheet feed direction. Upon insertion and removal of first sheet cassette 3 and second sheet cassette 3, sheet feed arm 6a may be moved up and down automatically. Such a structure will now be described in detail. As shown in FIGS. 4 and 5, a cam follower 43 shaped like a flat plate projects integrally from sheet feed arm 6a of a synthetic resin in a direction parallel with drive shaft 6 and extends over an auxiliary cam 44 formed on an upper surface of one of side plates 30c of second sheet cassette 30.

As shown in FIGS. 14A, 14B and 14C, auxiliary cam 44 comprises a first guide 44a that is inclined so as to be lower on the most downstream side of second sheet cassette 30 as seen in the sheet feed direction and gradually higher toward the upstream side thereof a second guide 44b connected to first guide 44a and having a substantially uniform height, and a third guide 44c connected to second guide 44b and recessed into a substantially V shape.

When first cassette 3 and second sheet cassette 30 are inserted unitarily from opening 2a at the front of housing 2, and cam follower 43 contacts at its lower surface with first guide 44a of auxiliary cam 44 provided on a side closer to main inclined separation plate 8, cam follower 43 may be raised as second sheet cassette 30 is moved forth (inward), and sheet feed arm 6a and sheet feed roller 6a may be pivoted upward together with cam follower 43, and sheet feed roller 6b and sheet feed arm 6a pass over main inclined separation panel 8.

When sheet feed arm 6a and sheet feed roller 6b are raised by cam follower 43 in contact with second guide 44b, sheet feed arm 6a and sheet feed roller 6b may retract through an opening 21c provided in bottom plate 21b of main frame 21 into a space within main frame 21. At this time, cam follower 43 may come in contact with or may be drawn closer to a lower surface of bottom plate 21b. This structure allows sheet feed arm 6a and sheet feed roller 6b to pivot vertically without increasing the height of a space defined between bottom plate 21b and second sheet cassette 30. Accordingly, the height between first sheet cassette 3 and bottom plate 21b of the main frame 21 may be reduced, and image recording apparatus 1 may be relatively short in overall height.

When cam follower 43 reaches a descending portion of third guide 44c after passing over second guide 44b, sheet feed arm 6a, which is urged downward, and sheet feed roller 6b may be pivoted downward. Then, as shown in FIG. 14A, sheet feed roller 6b may come into contact with the uppermost one of the sheets P1 stacked on bottom plate 30a.

When second sheet cassette 30 is moved back (outward) in a state where first sheet cassette 3 is set at a fully pushed position (sheet feed position) in housing 2, cam follower 43 slides over third guide 44c, second guide 44b (FIG. 14C), and first guide 44a in this order, and finally comes off side plate 30c of second sheet cassette 3. As shown in FIG. 14B, when second sheet cassette 3 is at a position moved back from sheet feed roller 6b (at a non-sheet-feed position), sheet feed roller 6b is allowed to contact the bottom (the uppermost one of the sheets P) of first sheet cassette 3 and perform sheet feed operation. On the other hand, when second sheet cassette 30 is moved forth to the sheet feed poison from the non-sheet-feed position in a state where first sheet cassette 3 is set at the sheet feed position in housing 2, cam follower 43 slides over first guide 44a, second guide 44b (FIG. 14C), and third guide 44c in this order, and sheet feed roller 6b is allowed to contact the uppermost one of the sheets P1 in second sheet cassette 30.

As described above, cam follower 43 provided at sheet feeder 6 cooperates with auxiliary cam 44 provided at second sheet cassette 30 to vertically pivot sheet feed roller 6a temporarily as second sheet cassette 30 is moved back and forth on first sheet cassette 3 in housing 2. Also, by the cooperation between cam follower 43 and auxiliary cam 44, sheet feed roller 6a is moved up and down automatically not to collide with main inclined separation plate 8 when first sheet cassette 3 is inserted to and removed from housing 2 unitarily with second sheet cassette 30 that is fully pushed into first sheet cassette 3. Thus, handling of first sheet cassette 3 and second sheet cassette 30 is made easy.

When second sheet cassette 30 stacked with smaller-sized sheets P1 is pushed to the sheet feed position near the downstream end of first sheet cassette 3 as seen in the sheet feed direction, in a state where larger-sized sheets P are stacked in first sheet cassettes 3, sheet feed roller 6b is allowed to press the uppermost one of the sheets P1 in second sheet cassette 30. Thus, image recording operation can be carried out in this state. On the other hand, when second sheet cassette 30 stacked with smaller-sized sheets P1 is pulled back to a position where round shafts 36 reach the upstream ends of guide holes 35 as seen in the sheet feed direction, second sheet cassette 3 is not detached from first sheet cassette 3, and the sheets P1 are prevented from getting out of position by slant guide 41. In this case, image recording operation can be carried out immediately by feeding the sheets P in first sheet cassette 3 with sheet feed roller 6b. Because elastic separation pad 8a of main inclined separation plate 8 is located within the width of bottom plate 30a of second sheet cassette 30, a single sheet feed roller 6b and a single separation plate 8 can be commonly used for separation and feeding of the sheets P (P1) stacked in first sheet cassette 3 and second sheet cassette 30.

First sheet cassette 3 may be replenished with sheets P by lifting the upstream end of the second sheet cassette 30 as shown in FIG. 7B in a state where second sheet cassette 30 is pushed with respect to first sheet cassette 3 (to the sheet feed position) as shown in FIG. 7A, or by lifting the upstream end of second sheet cassette 30 as shown in FIG. 8B in a state where second sheet cassette 30 is pulled back with respect to first sheet cassette 3 (to the non-sheet-feed position) as shown in FIG. 8A. In either case, second sheet cassette 30 may be pivoted upward about round shafts 36 to provide a larger vertical space at the upstream and of first sheet cassette 3, thereby facilitating loading sheets P in first sheet cassette 3.

Accommodating portion 3b of first sheet cassette 3 may be inclined downward toward main inclined separation plate 8, that is, toward the sheet feed direction, and accommodating portion 3b may open outward through opening 3a of housing 2. Sheet feed arm 6a of sheet feeder 6 may be configured to move tiltably. Thus, the sheets P stacked in accommodating portion 3b of first sheet cassette 3 are not displaced toward the upstream side as seen in the sheet feed direction, and an additional guide member to contact the trailing edges of the sheets P is not needed. Sheets P can be loaded to first sheet cassette 3 from its upstream side without lifting the upstream end of second sheet cassette 30.

Sheet receiver 30b may be formed continuously from bottom plate (holding portion) 30a of second sheet cassette 30. When image recording is performed with second sheet cassette 30 set at the sheet feed position as shown in FIG. 6A, smaller-sized sheets P1 in second sheet cassette 30 are fed to recording unit 7, and the sheets P1 recorded thereon are received by sheet receiver 30b without being mixed with the blank sheets P1. Also, when image recording is performed for larger-sized sheets P a shown in FIG. 6B, the sheets P recorded thereon are received by sheet receiver 30b of second sheet cassette 30 pulled back to the non-sheet-feed position, reliably without projecting from sheet receiver 30b. In these cases, because sheet receiver 30b is formed with a cutout 39 open toward the front of housing 2, the user can insert fingers into cutout 39 and readily take out the sheets P (P1).

Figure 10A:
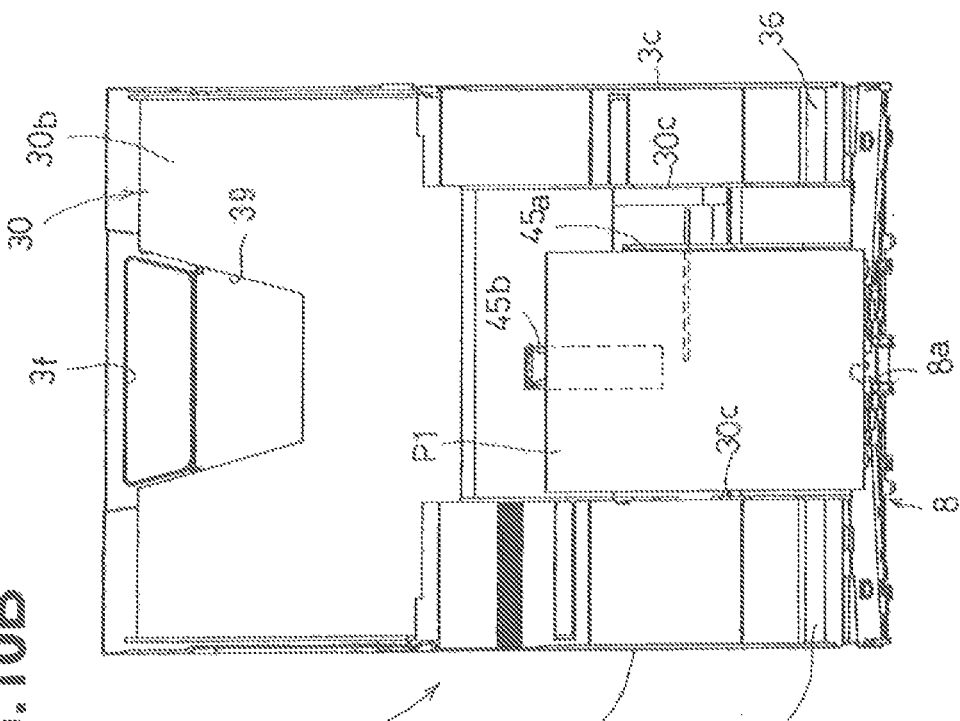
FIG. 10A is a plan view showing a state where a rear guide and a movable side guide are used in the second sheet cassette.
Figure 10B:
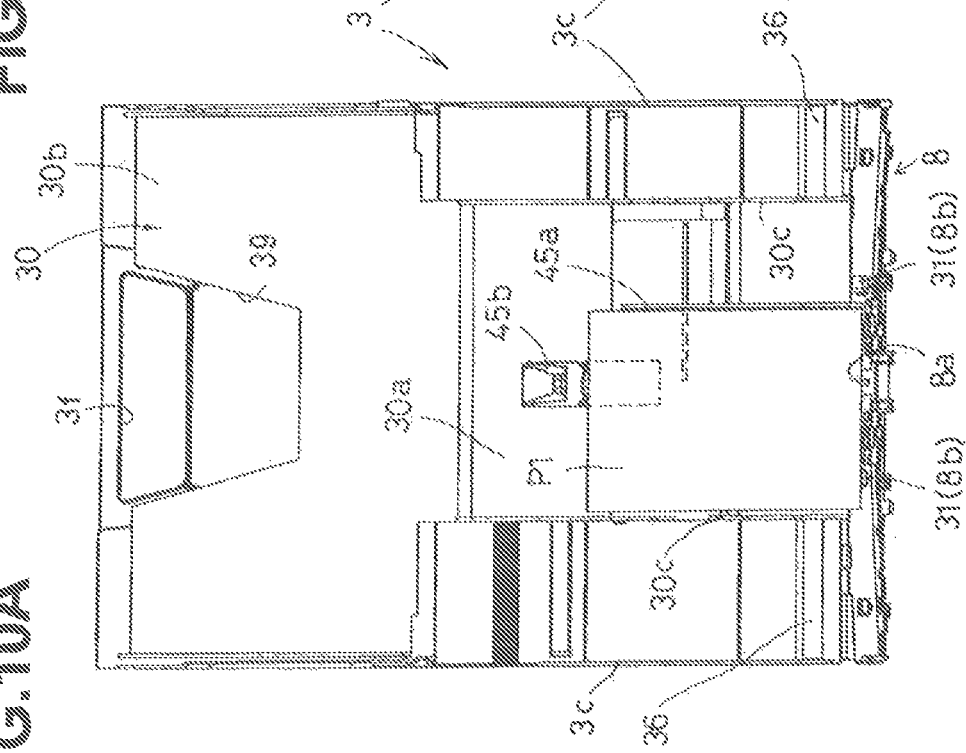
FIG. 10B is a plan view showing another state where the rear guide and the movable side guide are used in the second sheet cassette.

FIGS. 10A and 10B show a modification of guide unit 41 of the first embodiment, of the present invention which guides the side edges of the sheets P1 on bottom plate 30a of second sheet cassette 30 to be parallel with the sheet feed direction. In this modification, the guide unit comprises one of side plates 30c as a fixed side guide that guides one side edge of each sheet P1, a movable side guide 45a that extends in parallel with the one of side plates 30 and moves towards and from one of the side plates 30c, and a rear guide 45b that is movable along the sheet feed direction to contact the trailing edge of each sheet P1. Movable side guide 45a and rear guide 456b may be mounted on bottom plate 30a of second sheet cassette 30 so as to be movable linearly. With this structure, even when the ratio of a shorter side and a longer side of the sheet P1 used varies, the sheet P1 can be positioned reliably. In addition, smaller-sized sheets P1 are placed at their smaller side edges opposed to elastic separation pad 8a of first sheet cassette 3, and thus the sheets P1 may be separated one by one by elastic separation pad 8a in cooperation with sheet feed roller 6b.

Figure 11:
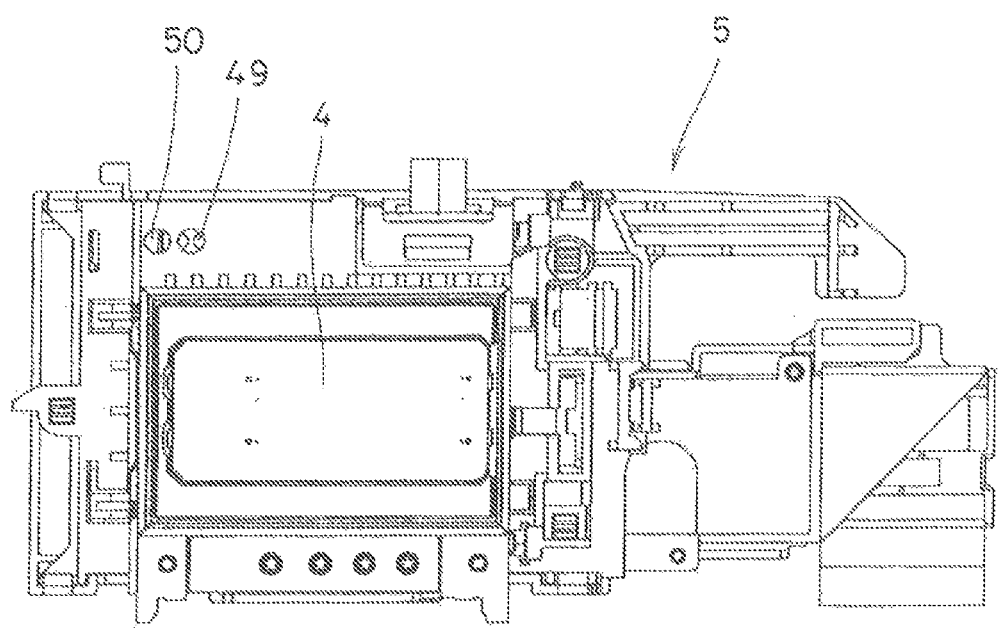
FIG. 11 is a bottom view of a carriage showing sensors.
Figure 12:
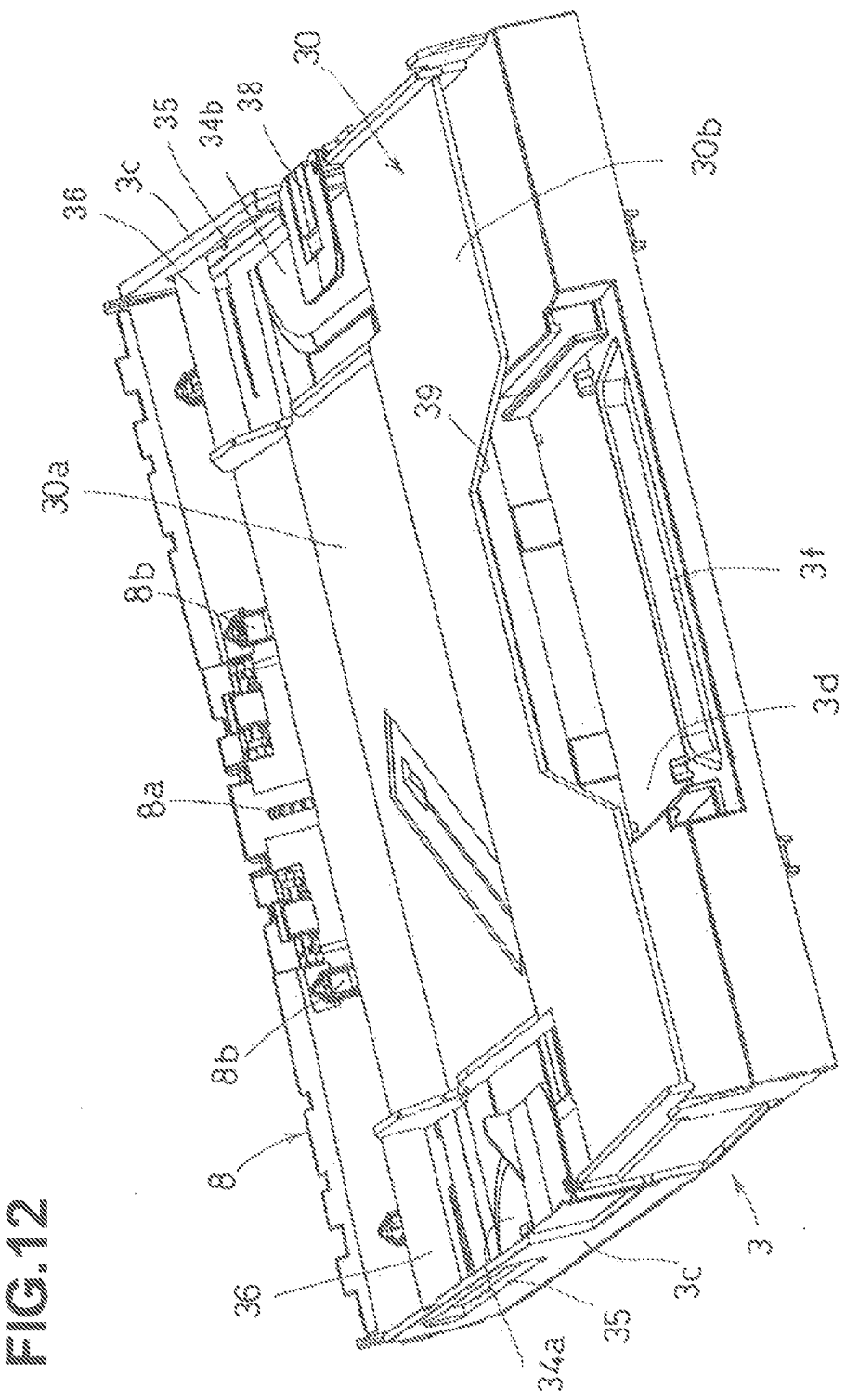
FIG. 12 is a perspective view showing an inclined separation plate of the first sheet cassette.

As shown in FIG. 11, image recording apparatus 1 may comprise a media sensor 49 and a cassette sensor 50 that are provided on an underside of carriage 5. Media sensor 49 detects the width of the sheet P (P1) fed to the recording unit 7, and cassette sensor 50 detects whether second sheet cassette 30 is set at the sheet feed position A non-contact type photosensitive sensor, such as an infrared sensor, may be used for both media sensor 49 and cassette sensor 50. A detection hole (not shown) may be provided in the platen intermediate in the Y-axis direction, so that cassette sensor 50 can detect bottom plate 30a through the detection hole only when second sheet cassette 30 is set at the sheet feed position. When carriage S moves in the Y-axis direction, media sensor 49 detects the width of the leading edge of the sheet P (P1) that is stopped temporarily after being fed a little bit further from register rollers 27. When the user commands image recording apparatus 1 to start image recording by designating the desired type or size of a sheet to be used, and cassette sensor 50 determines from a detected value that second sheet cassette 30 stacked with the designated sheets is not set at (pushed to) the sheet feed position, sheet feed may be prohibited and an error message may be reported to the user. Sheet feed is not permitted until the user sets second sheet cassette 30 at the sheet feed position. Similarly, when first sheet cassette 3 is stacked with the designated sheets, but second sheet cassette 30 stacked with the sheets different from the desired sheets is set at the sheet feed position, sheet feed is prohibited and an error message may be reported to the user. Sheet feed is not permitted until the user sets second sheet cassette 30 at the non-sheet-feed position.

When the carriage 5 moves in the Y-axis direction, media sensor 49 detects the width of the leading edge of the sheet P (P1) that is stopped temporarily after being fed a little bit further from register rollers 27, and an electronic control device (not shown) determines the size of the sheet P (P1) from a detected value. When the size determined does not match the type or size designated by the user, image recording on the fed sheet P (P1) is prohibited and the blank sheet P (P1) is discharged to sheet discharge portion 10. Thus, the user does not waste sheets. The setting position of the sheet P (P1) in the Y-axis direction also may be detected by media sensor 49.

Figure 15:
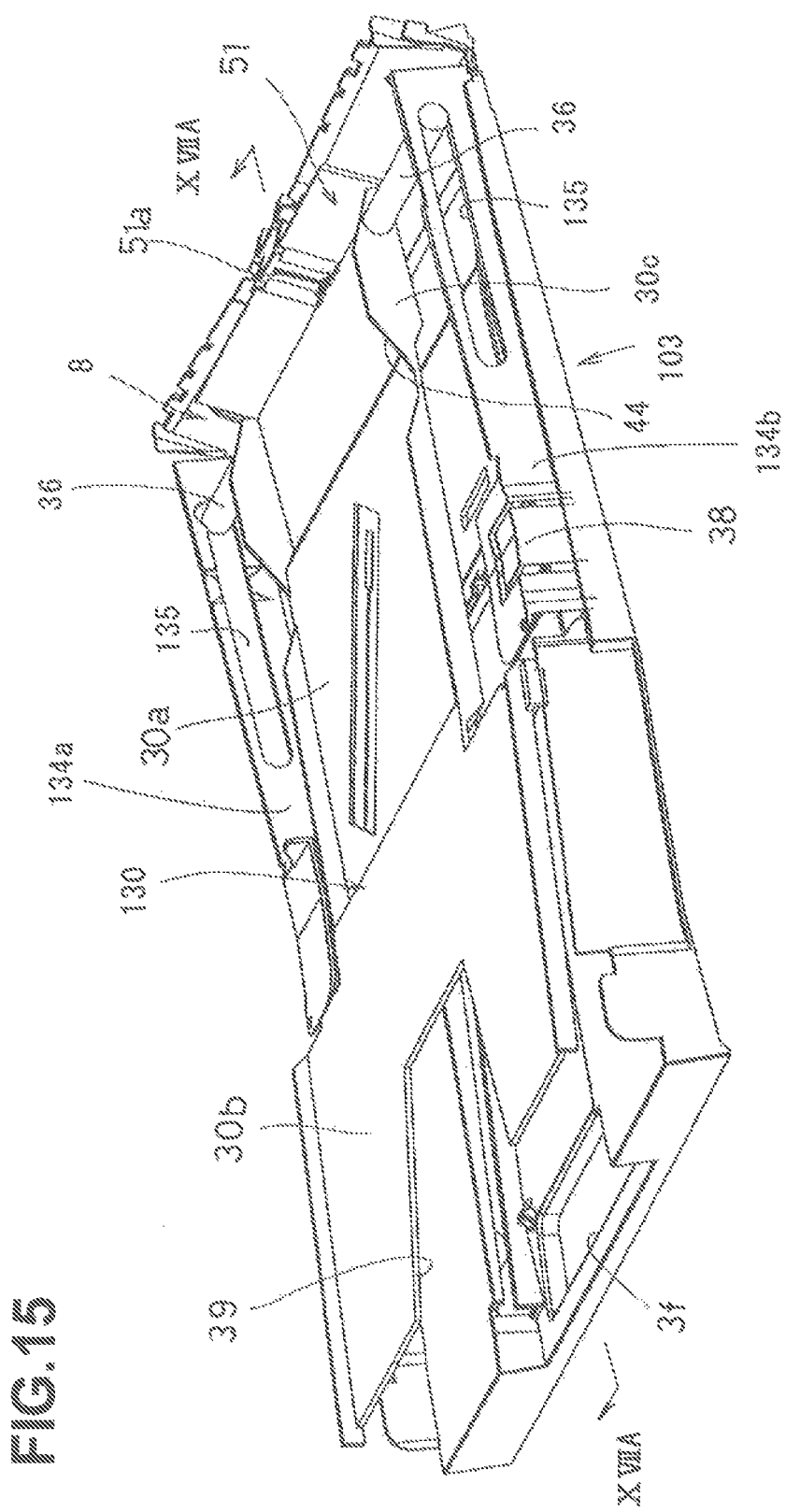
FIG. 15 is a perspective view of modified first and second sheet cassettes, where the second sheet cassette having an auxiliary inclined separation plate is set at the sheet feed position on the first sheet cassette.
Figure 17A:
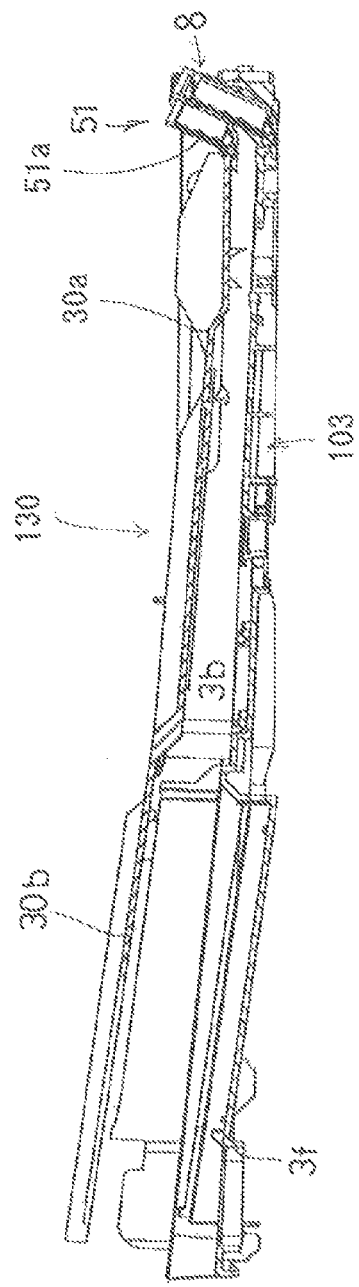
FIG. 17A is a cross-sectional view of the first and second sheet cassettes taken along line XVIIA-XVIIA of FIG. 15.
Figure 17B:
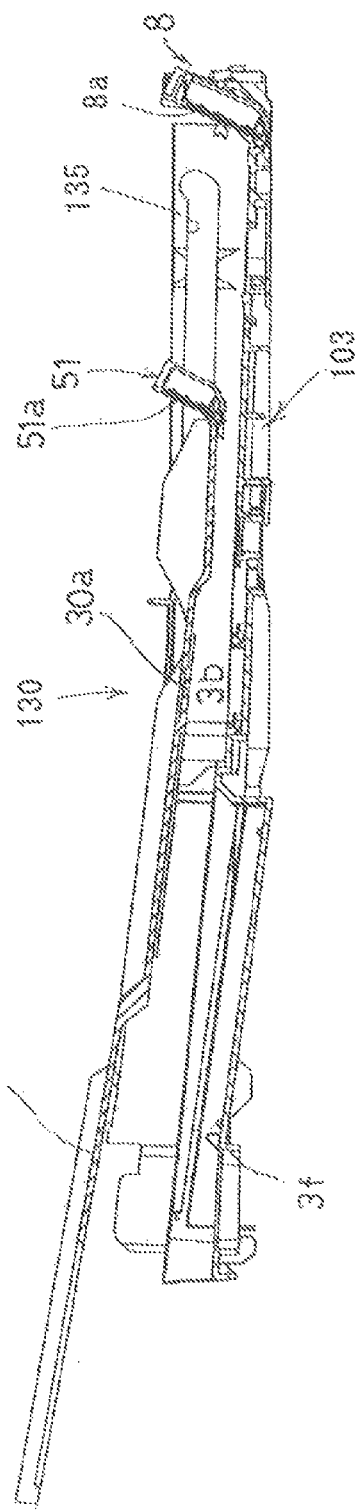
FIG. 17B is a cross-sectional view of the first and second sheet cassettes taken along line XVIIB-XVIIB of FIG. 16.
Figure 18:
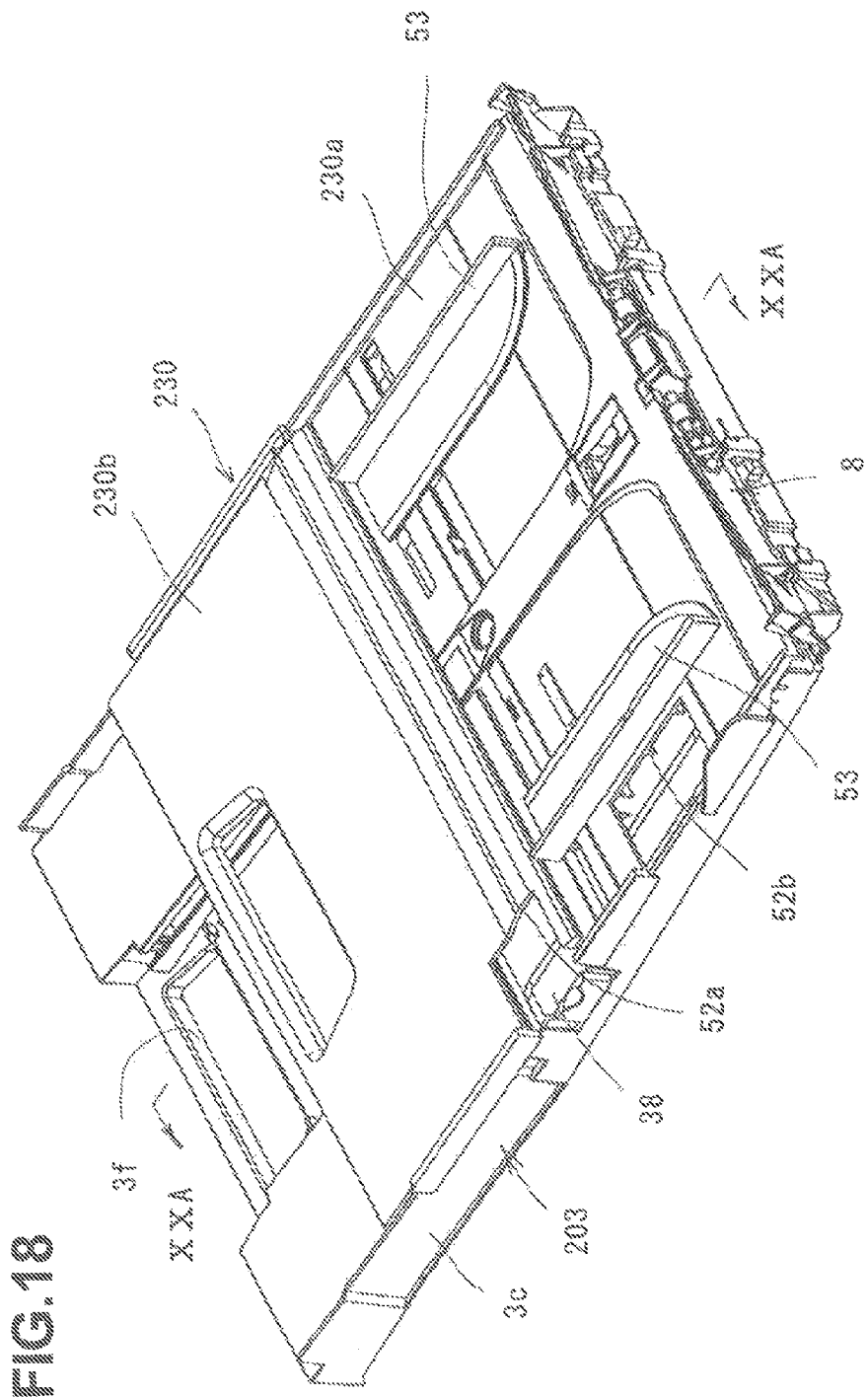
FIG. 18 is a perspective view of modified first and second sheet cassettes, where the piggyback-type second sheet cassette is set at the sheet feed position on the first sheet cassette.

FIGS. 15, 16, 17A, and 17B show a modification of first sheet cassette 3 and second sheet cassette 30 of the first embodiment of the present invention. A second sheet cassette 130 may comprise an auxiliary inclined separation plate 51 at a downstream end of a bottom plate 30a as seen in the sheet feed direction. Auxiliary inclined separation plate 51 may be provided with an elastic separation pad 51a that is similar to elastic separation pad 8a provided for main inclined separation panel 8. As shown in FIGS. 15 and 16, guide holes 135 for connecting second sheet cassette 130 via round shafts 36 to first sheet cassette 103 may be formed in side guides 134a, 134b of first sheet cassette 103. As shown in FIGS. 15 and 17A, when second sheet cassette 130 is pushed with respect to the first sheet cassette 103 and set at the sheet feed position, auxiliary inclined separation plate 51 is located adjacent to an inner surface of main inclined separation plate S. Sheets P1 in second sheet cassette 130 are fed by rotation of a sheet feed roller 6b and separated one by one at elastic separation pad 51a of auxiliary inclined separation plate 51.

The sheets P1 stacked on bottom panel 30a are close at their leading edges to the auxiliary inclined separation plate 51. When second sheet cassette 130 is moved back and forth, auxiliary inclined separation plate 51 cooperates with guide unit 41 to keep the sheets P1 in position. Accordingly, switching between first sheet cassette 103 and second sheet cassette 130 may be performed smoothly.

FIGS. 18, 19, 20A, 20B show another modification of first sheet cassette 3 and second sheet cassette 30 of the first embodiment of the present invention. A second sheet cassette 230 may be placed on a first sheet cassette 203. Second sheet cassette 230 may comprise a bottom plate 230a, as a sheet holding portion, and a sheet receiver 230b that has the same width as that of first sheet cassette 3, and second sheet cassette 230 may be placed on right and left side plates 3c of first sheet cassette 203. Second sheet cassette 230 may be formed with cutouts 52a, 52b to allow the user to operate a handle 38 for side guides 34a, 34b even when second sheet cassette 230 is set on first sheet cassette 203 either at a pushed or pulled position.

As shown in FIGS. 18, 19, 20A, and 20B, sheet receiver 230b may be formed with a hole-shaped cutout 54 at its downstream end as seen in the sheet discharge direction. The user can pull second sheet cassette 230 outward through opening 2a by putting their fingers in cutout 54 and readily take out the recorded sheets P piled on sheet receiver 30b.

Figure 19:
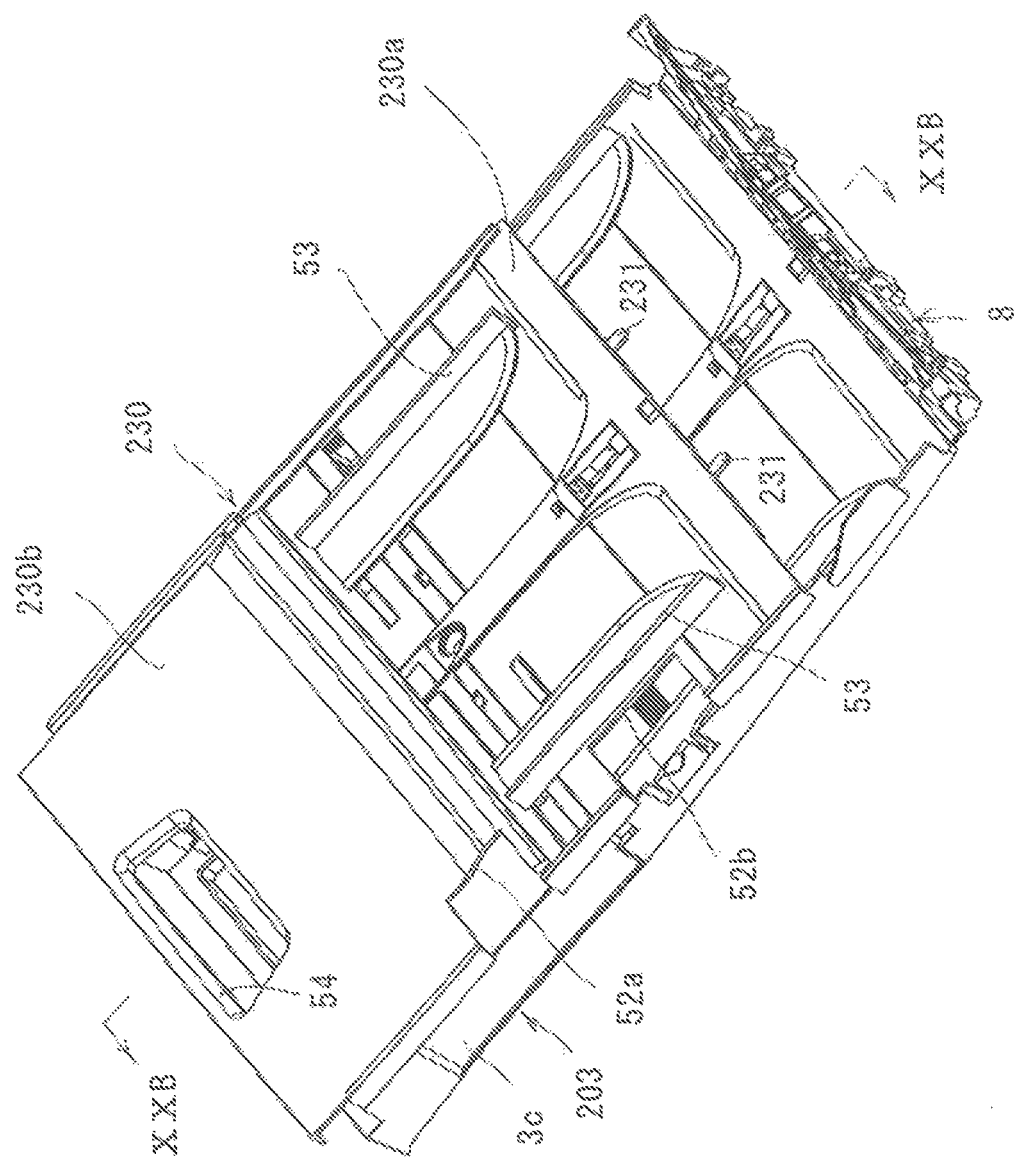
FIG. 19 is a perspective view of the modified first and second sheet cassettes, where the second sheet cassette is moved back to the non-sheet-feed position on the first sheet cassette.

In this modification of the present invention, because second sheet cassette 230 merely is placed on first sheet cassette 203, second sheet cassette 230 is likely to be displaced in the right-left direction (sheet width direction). To prevent such a displacement, with bottom plate 230a is provided, at its downstream end as seen in the sheet feed direction, engaging pieces 231, as shown in FIG. 19. Engaging pieces 231 engage positioning holes (not shown) in main inclined separation plate 8 when second sheet cassette 230 is moved forth to be set at the sheet feed position. Second sheet cassette 230 may comprise right and left guides 53, as a guide unit, that move in parallel with each other such that the distance therebetween is widened or narrowed to position and guide the side edges of sheets P1 to be parallel with the sheet feed direction.

Also, in this modification, of the present invention feeding of sheets of one size or the other can be readily switched by moving back and forth second sheet cassette 230 to the non-sheet-feed position or the sheet feed position, in a state where sheets P are stacked in first sheet cassette 203 and sheets P1 different in size from the sheets P are stacked in second sheet cassette 230.

Figure 21:
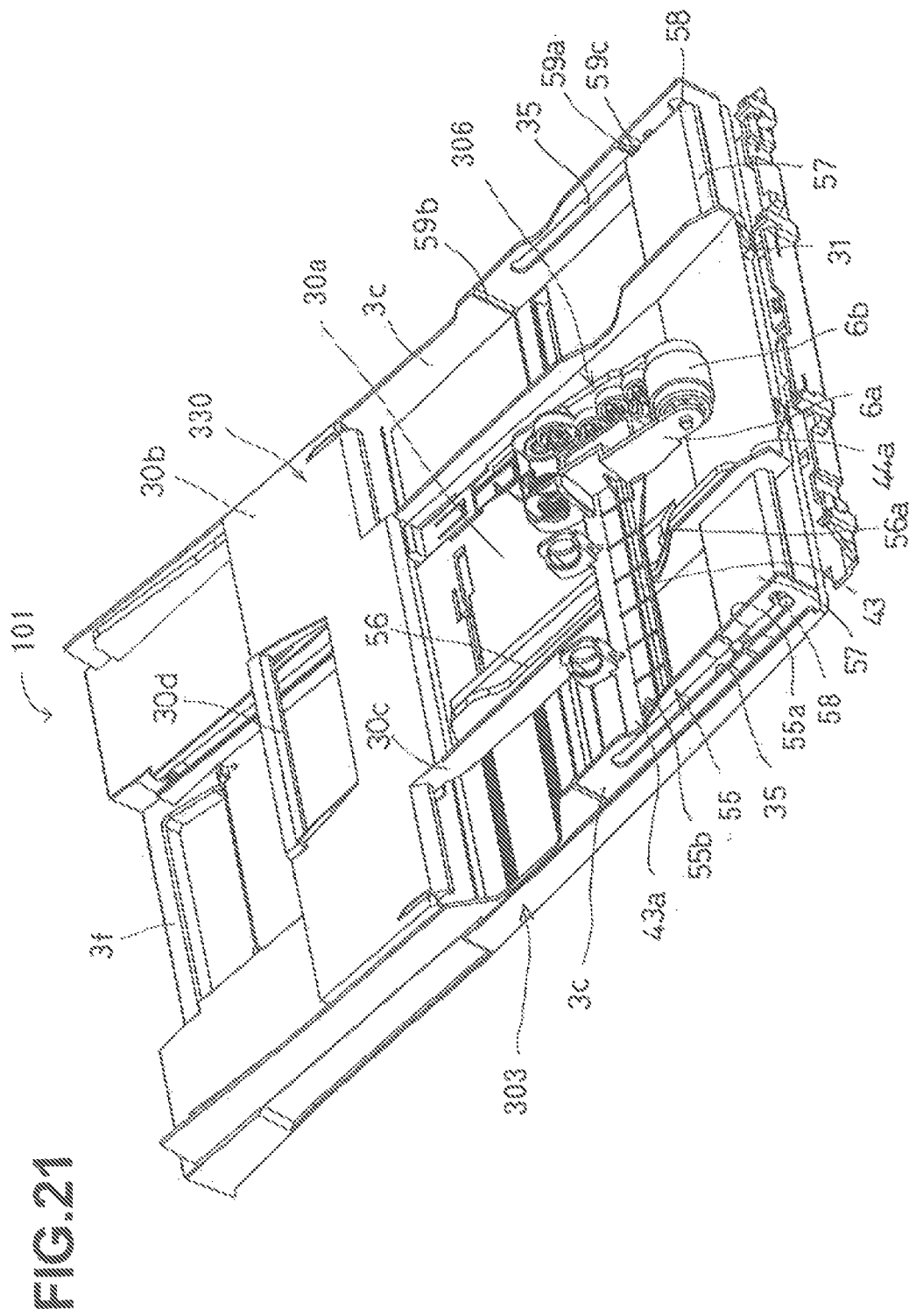
FIG. 21 is a perspective view of a sheet feed device according to a second embodiment of the present invention in which a second sheet cassette is set at a sheet feed position on a first sheet cassette.
Figure 22:
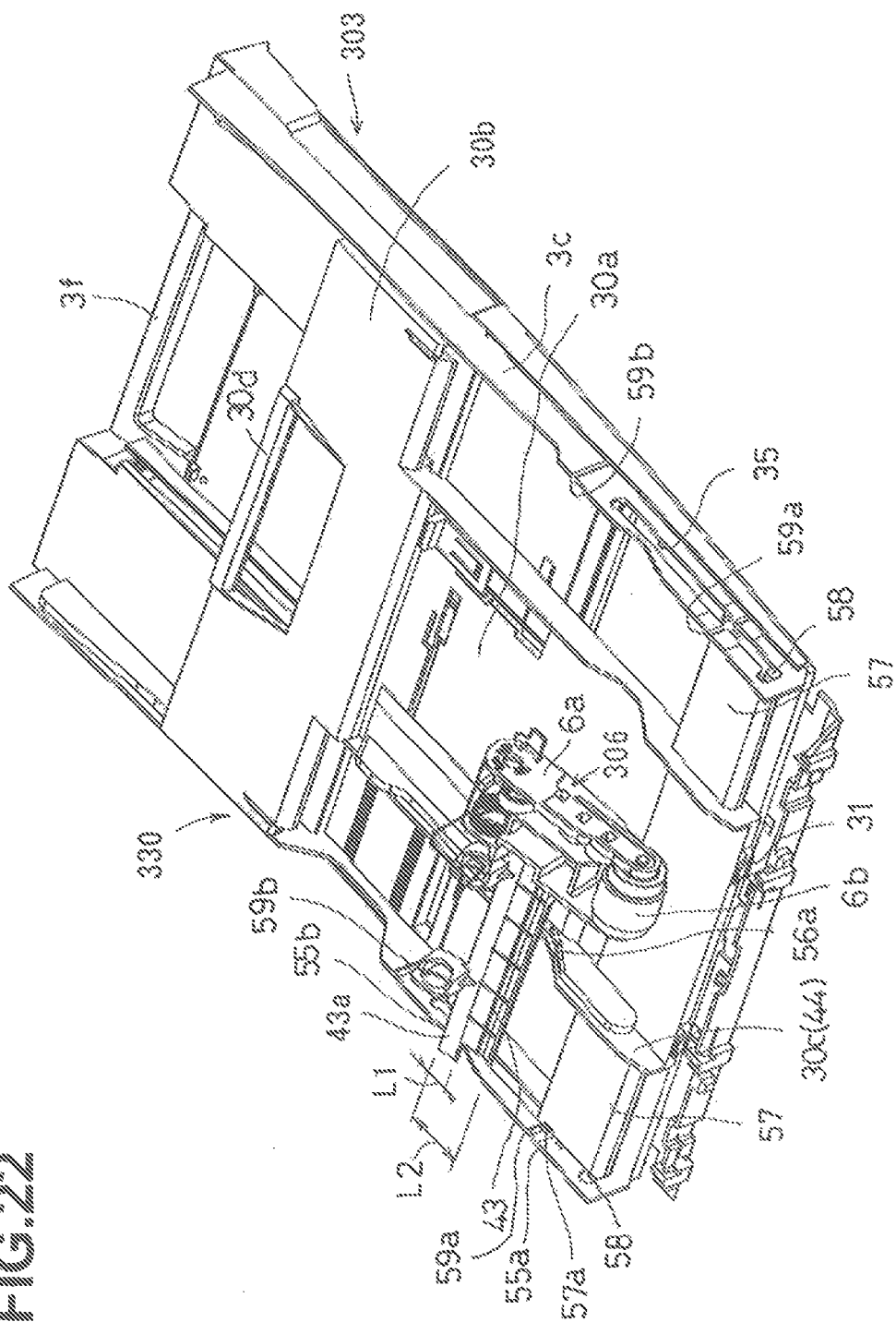
FIG. 22 is a perspective view of the sheet feed device according to the second embodiment as viewed from a different direction from in FIG. 21.

FIGS. 21-24 show a sheet feed device 101 according to a second embodiment of the present invention. In this embodiment, a sheet feed roller 6b of a sheet feeder 306 is moved up and down corresponding to the back and forth movements of a first sheet cassette 303 and a second sheet cassette 330. A cam follower 43 shaped like a flat plate may project integrally from a sheet feed arm 6a (drive shaft 6d is omitted from FIGS. 21-23) and extends towards and over an auxiliary cam 44 and a main cam 55. Auxiliary cam 44 may be formed to have a varying height on an upper surface of one of side plates 30c of second sheet cassettes 30, and main cam 55 may be formed to have a varying height on an upper surface of one of side plate 3c of first sheet 26 cassette 303. An end 43a of cam follower 43, which contacts main cam 55, has a length L1 in the sheet-feed direction, while cam follower 43, which contacts auxiliary cam 44, has a length L2. L1 may be smaller than L2, as shown in FIG. 22.

Auxiliary cam 44 may be the same as in the first embodiment of the present invention (FIGS. 4, 5, 6B, 14A, 14B and 14C), and may comprise a first guide 44a that is inclined so as to be lower on the most downstream side of second sheet cassette 330 and gradually higher toward the upstream side thereof as seen in the sheet feed direction, a second guide 44b connected to first guide 44a and having a substantially uniform height, and a third guide 44c connected to second guide 44b and recessed into a substantially V shape.

Figure 24:
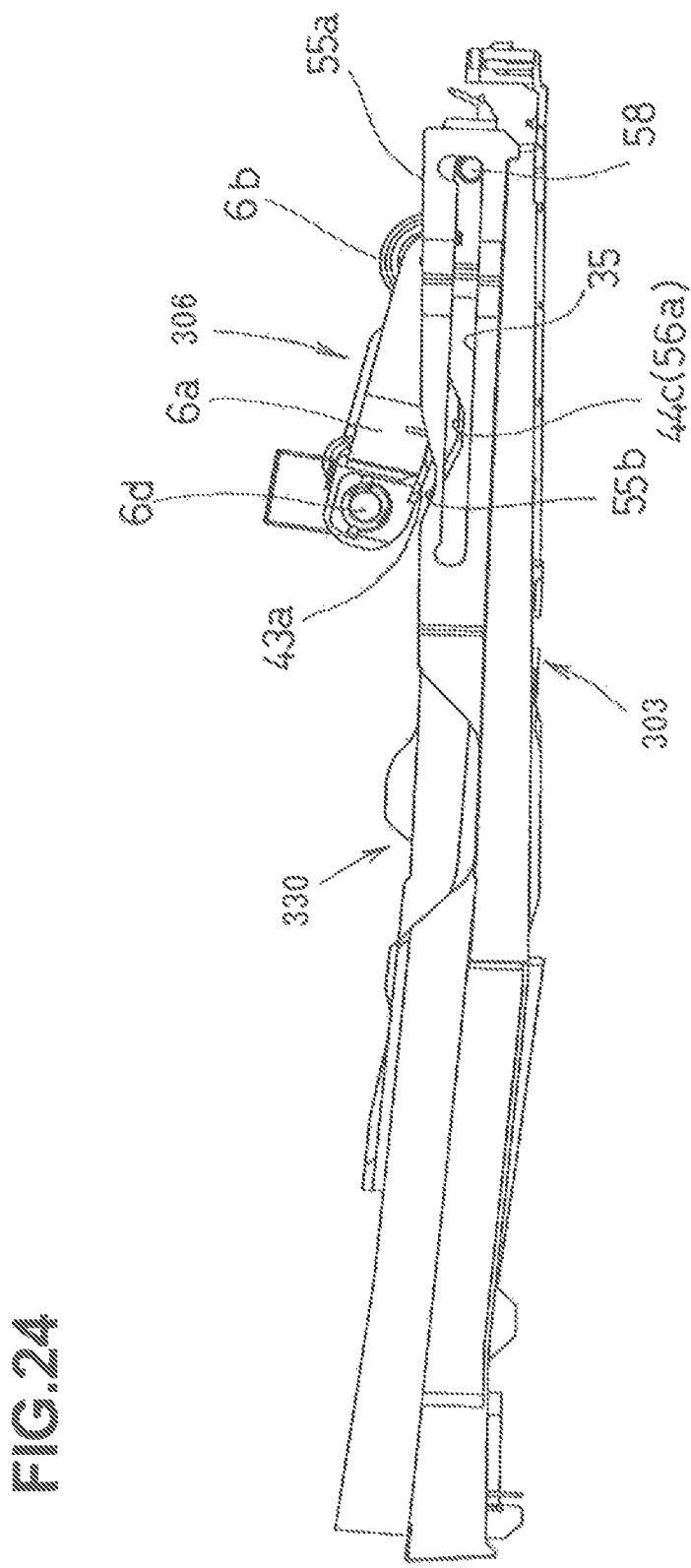
FIG. 24 is a cross-sectional view of the sheet feed device taken along line XXIV-XXIV of FIG. 23.

Main cam 55 may comprise a first guide 55a that has a substantially uniform height from the most downstream side of first sheet cassette 303 toward the upstream side thereof as seen in the sheet feed direction, and a second guide 55b connected to first guide 55a and shaped like V having a smaller height in the middle. As shown in FIG. 24, second guide 55b and third guide 44c correspond with each other in position in the sheet feed direction. As shown in FIGS. 21 and 22, a sheet side guide plate 56 may be provided on a bottom plate (holding portion) 30a of second sheet cassette 330, and may be formed with a recess 56a at a position corresponding with third guide 44c and second guide 55b, so as not to interfere with the movement of cam follower 43.

A guide hole 35 may be formed in each of side plates 3c of first sheet cassette 303 to be elongated along the sheet feed direction. A wing 57 may be formed on each side of bottom plate 30a of second sheet cassette 330 to extend close to an inner surface of each of side plates 3c. As shown in FIGS. 21 and 22, a round shaft 58 projecting from the downstream end of each of the wings 57 toward the corresponding side plate 3c may be movably fitted into the corresponding guide hole 35. With this structure, second sheet cassette 330 is movable back and forth with respect to first sheet cassette 303 and is pivotable upward and downward about round shafts 58.

Two ribs 59a, 59b6 may be formed on an inner surface of each of side plates 3c at appropriate intervals in the moving direction of second sheet cassette 330. A projection 57a may be integrally formed with each of the wings 57 to provide a click feel when the user moves second sheet cassette 330 selectively back and forth, so that projections 57a pass beyond ribs 59a, 50b.

First sheet cassette 303 and second sheet cassette 330 may be inserted into housing 2 unitarily in a state where second sheet cassette 330 comprising auxiliary cam 44 is fully pushed or pulled back with respect to first sheet cassette 303 comprising main cam 55. In either case, when end 43a of cam follower 43 of sheet feeder 306 passes an end edge of one of side plates 3c and rides on first guide 55a, sheet feed arm 6a is raised to a substantially horizontal orientation, and sheet feed roller 6b passes beyond main inclined separation plate 8. After that, when end 43a approaches the lowest portion of the V-Shape of the second guide 55b, sheet feed arm 6a is pivoted downward, and sheet feed roller 6b is allowed to selectively contact the uppermost one of the sheets P1 in second sheet cassette 330 or the uppermost one of the sheets P in first sheet cassette 303.

When second sheet cassette 330 is moved forth in a state where first sheet cassette 303 is set at the sheet feed position in housing 2, cam follower 43 comes into sliding contact with auxiliary cam 44 of second sheet cassette 330, and sheet feed arm 6a is pivoted upward and then downward. Thereby, sheet feed roller 6b is allowed to contact the upper most one of the sheets P1 stacked on bottom plate 30a of second sheet cassette 330. On the other band, when second sheet cassette 30 is moved back, cam follower 43 comes into sliding contact with auxiliary cam 44, and sheet feed arm 6a is pivoted upward and then downward. Thus, sheet feed roller 6b is allowed to contact the upper most one of the sheets P in accommodating portion 3b of first sheet cassette 303 without displacing the sheets P1 stacked in second sheet cassette 330. Second sheet cassette 330 may be moved back and forth by gripping a handle 30d provided at a downstream end of the sheet receiver 30b as seen in sheet discharge direction.

Figure 23:
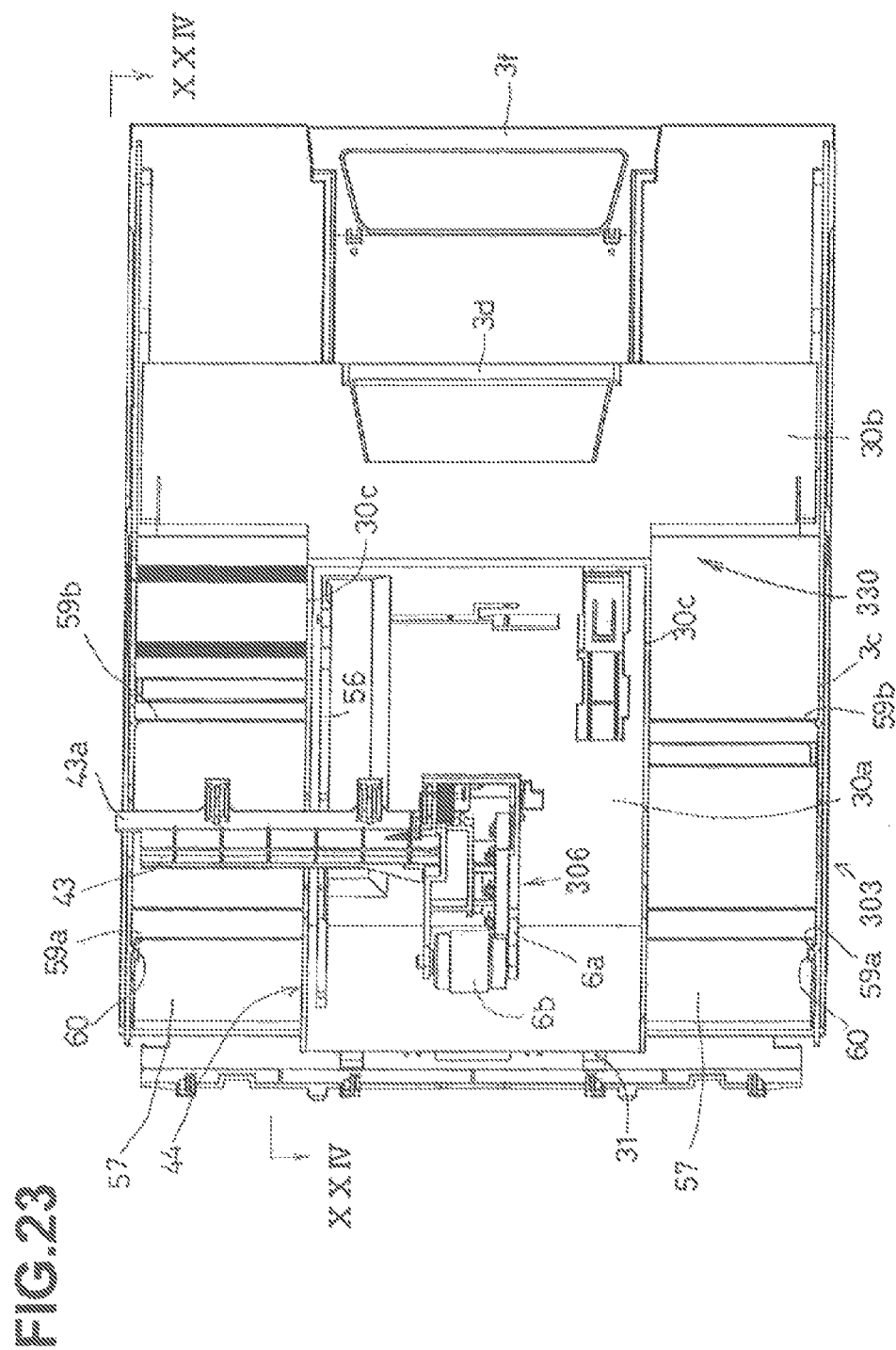
FIG. 23 is a plan view of the sheet feed device according to the second embodiment.

In FIGS. 21-23, side guides of the first sheet cassette 303 are omitted.

As described above, by the cooperation of cam follower 43 and auxiliary cam 44, sheet feed roller 6a is moved up and down automatically as second sheet cassette 330 is moved back and forth on first sheet cassette 303 in housing 2. By the cooperation of end 43a of cam follower 43 and main cam 55, sheet feed roller 6a is moved up and down automatically without colliding with main inclined separation plate 8 when first sheet cassette 303 is inserted into and removed from housing 2 unitarily with second sheet cassette 330. Thus, handling of first sheet cassette 3 and second sheet cassette 30 is made easy.

FIGS. 25-28 show a sheet feed device 102 according to a third embodiment of the present invention. In this embodiment, a first sheet feeder 306 for a first sheet cassette 403 and a second sheet feeder 60 for a second sheet cassette 430 may be disposed side by side, and first sheet feeder 306 and second sheet feeder 60 may be configured to be raised or lowered selectively. When sheets P in first sheet cassette 403 are fed, a sheet feed roller 6b of first sheet feeder 306 contacts the uppermost one of the sheets P in an accommodating portion 3b of first sheet cassette 403, and a sheet feed roller 60b of second sheet feeder 60 is held at a raised position. On the other hand, when sheets P1 in the second sheet cassette 430 are fed, the second sheet feed roller 60b of the second sheet feeder 60 contacts the uppermost one of the sheets P1 on a holding portion 30a of second sheet cassette 430, and sheet feed roller 6b of first sheet feeder 306 is kept at a raised position.

Figure 25:
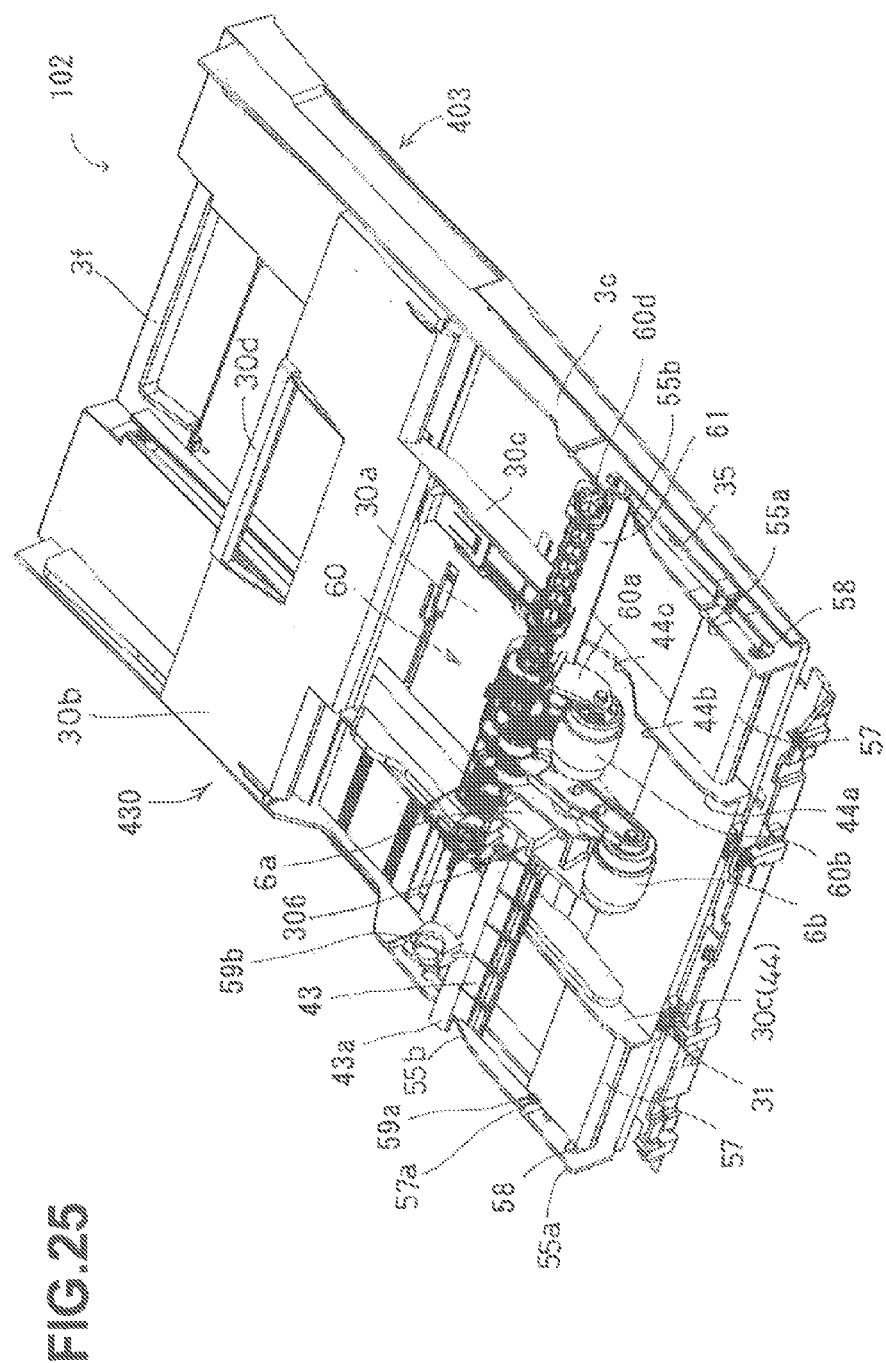
FIG. 25 is perspective view of a sheet feed device according to a third embodiment of the invention in which a second sheet cassette is set at a sheet feed position on a first sheet cassette.
Figure 26:
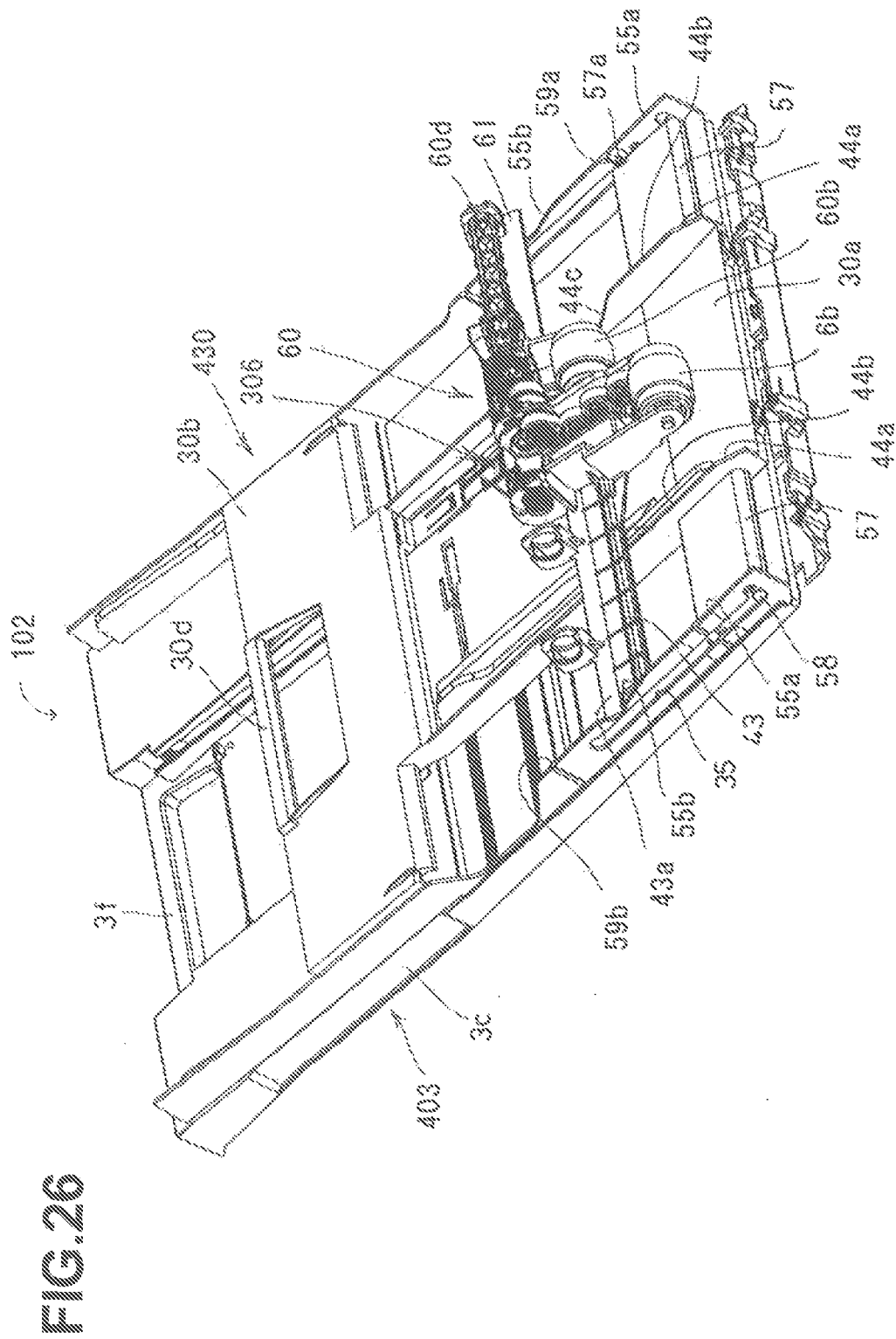
FIG. 26 is a perspective view of the sheet feed device according to the third embodiment of the present invention, as viewed from a different direction from in FIG. 25.
Figure 27:
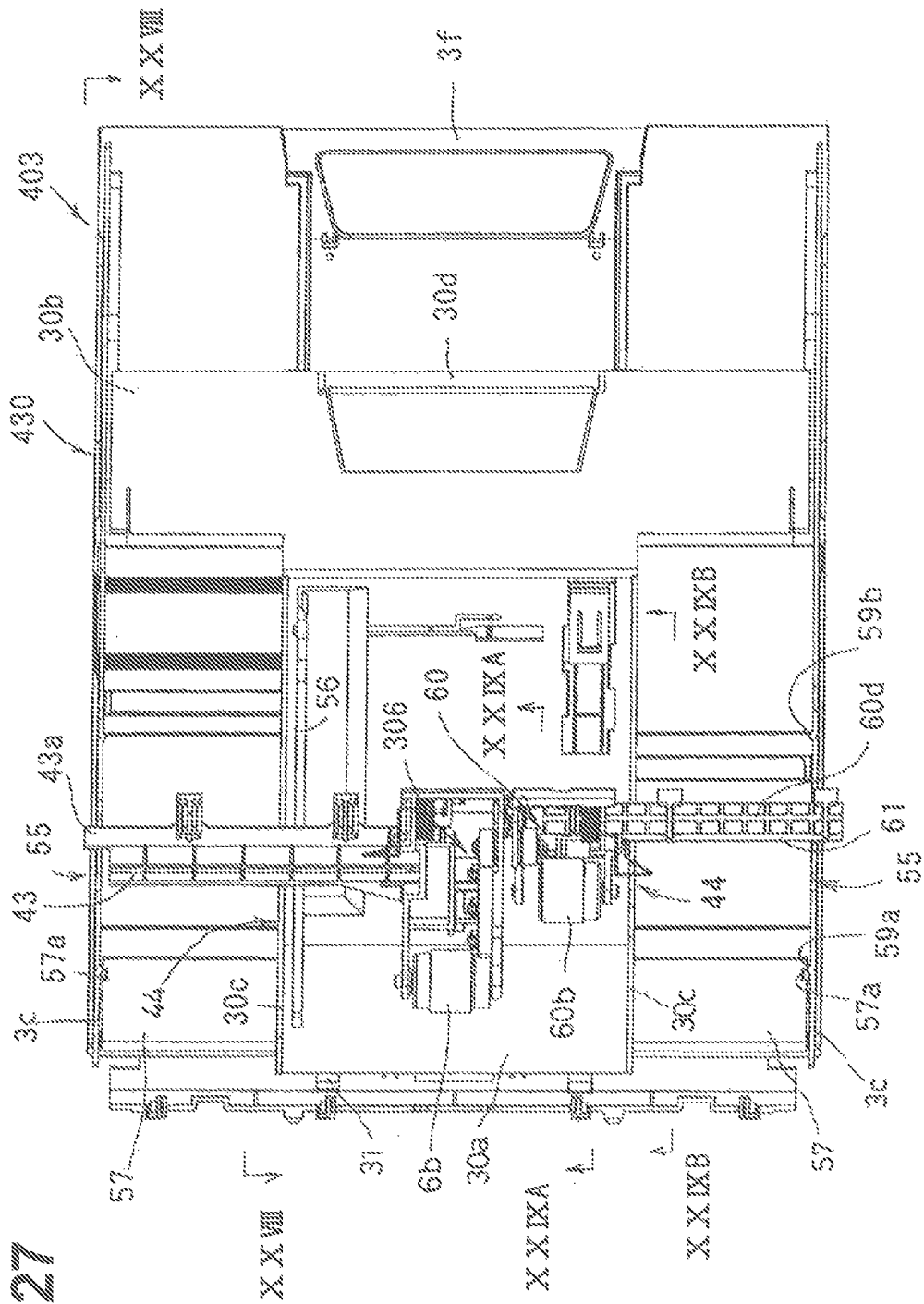
FIG. 27 is a plan view of the sheet feed device according to the third embodiment.
Figure 28:
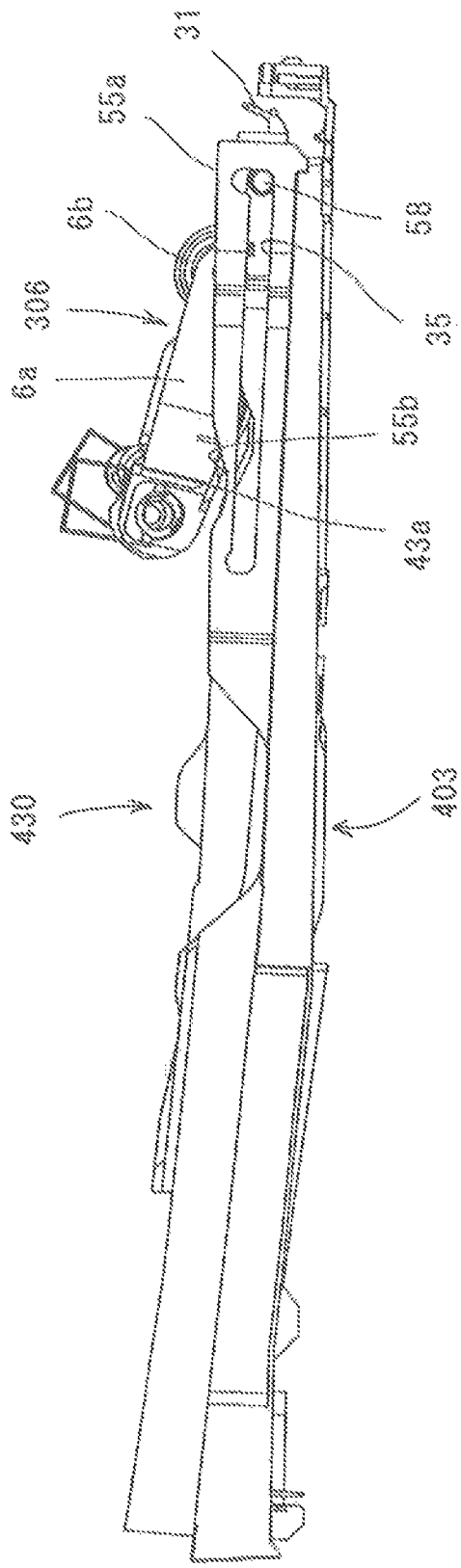
FIG. 28 is a cross-sectional view of the sheet feed device taken along line XXVIII-XXVIII of FIG. 27.

To be more specific, a main cam 55 may be formed, similarly to that in the second embodiment, of the present invention on each of side plates 3c of first sheet cassette 403, and an auxiliary cam 44 may be formed, similarly to that in the second embodiment, of the present invention on one side plate 30c (with which a cam follower 61 to be described later contacts) to comprise a first guide 44a, a second guide 44b, and a third guide 44c shaped like V. The other side plate 30c (with which a cam follower 43 contacts) may be formed at its upper surface with only first guide 44a and second guide 44b that is substantially horizontal and has a uniform height. In FIGS. 25-27, side guides of the first sheet cassette 403 are omitted.

In FIGS. 25-27, drive shaft 6d and main inclined separation plate 8 are omitted.

Second sheet feeder 60 is the same, in the basic structure, as first sheet feeder 306. A drive shaft 60d and cam follower 61 of second sheet feeder 60 are parallel with drive shaft 6d of first sheet feeder 306, but extend in the opposite direction to that of drive shaft 6d. That is, drive shaft 60d and cam follower 61 extend toward and over the side plates 3c, 30c provided on a side remote from cam follower 43, as shown in FIGS. 25-27.

Figure 29A:
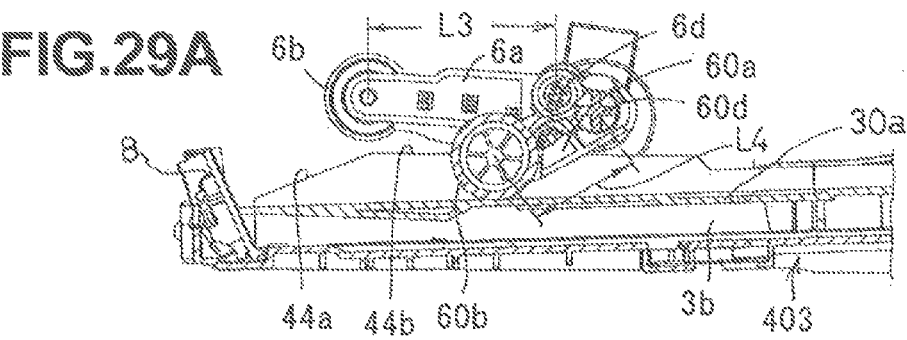
FIG. 29A is a cross-sectional view of the sheet feed device taken along line XXIXA-XXIXA of FIG. 27.
Figure 29B:
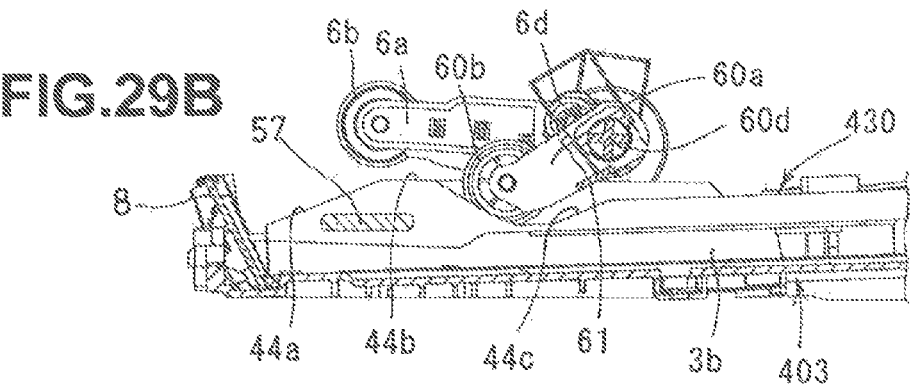
FIG. 29B is a cross-sectional view of the sheet feed device taken along line XXIXB-XXBIXB of FIG. 27.
Figure 29C:
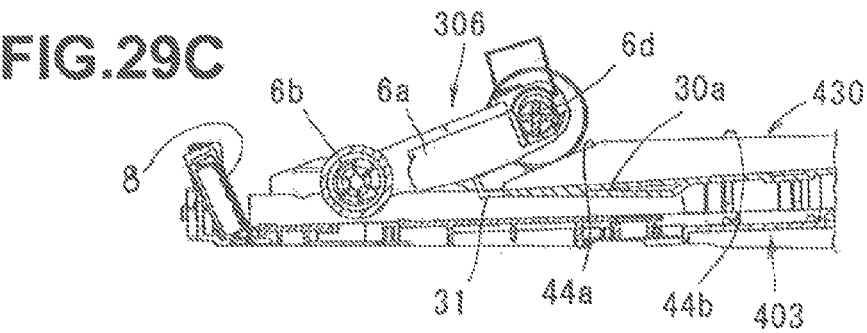
FIG. 29C is a side view of a first sheet feeder according to the third embodiment in a state where the second sheet cassette is moved back to a non-sheet-feed position.

In this third embodiment of the present invention, as shown in FIGS. 25-28, when first sheet cassette 403 and second sheet cassette 430 are inserted unitarily into housing 2 in a state where second sheet cassette 430 is pushed to sheet feed position with respect to the first sheet cassette 403; an end 43a of cam follower 43 of first sheet feeder 306 contacts an end edge of one side plate 3c of first sheet cassette 403 and rides on a first guide 55a. At this time, a sheet feed arm 6a is raised to a substantially horizontal orientation, and sheet feed roller 6b passes beyond a main inclined separation plate 8. Then, an intermediate portion of cam follower 43 is kept in contact with high horizontal second guide 44b, and thereby sheet feed arm 6a of first sheet feeder 306 is kept at a substantially horizontal orientation, as shown in FIGS. 29A and 29B. Meanwhile, when cam follower 61 of second sheet feeder 60 contacts an end edge of the other side plate 3c of first sheet cassette 403 and rides on a first guide 55a, sheet feed arm 60a is pivoted upward, and sheet feed roller 60b is allowed to pass over main inclined separation plate 8. Then, cam follower 61 contacts a first inclined guide 44a and a horizontal second guide 44b of auxiliary cam 44 of the other side plate 3c. After that, when cam follower 61 reaches the low, V-shaped third guide 44c (and a V-shaped second guide 55b of first sheet cassette 403), sheet feed arm 60a is pivoted downward, and sheet feed roller 60b is allowed to contact the uppermost one of the sheets P1 stacked on bottom plate 30a of second sheet cassette 430.

Figure 29D:
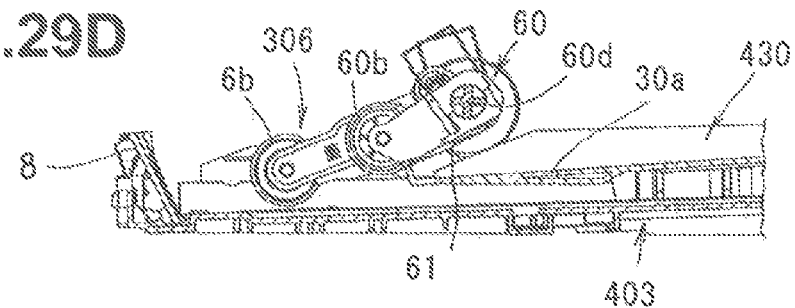
FIG. 29D is a side view of the first sheet feeder and a second sheet feeder according to the third embodiment, in a state where the second sheet cassette is moved back to the non-sheet-feed position.

When second sheet cassette 430 is moved to the non-sheet-feed position in a state where first sheet cassette 403 is set at the sheet feed position, cam follower 61 of second sheet feeder 60 is raised along V-shaped third guide 44c, and slides on high horizontal second guide 44b. After that, cam follower 61 is lowered along the first inclined guide 44a, and finally comes off auxiliary cam 44. At this time, however, an end of cam follower 61 is in contact with high horizontal first guide 55a of first cam 55, and thus sheet feed roller 60b is kept at such an orientation that its lower surface is away from the uppermost one of the sheets P in accommodating portion 3b of first sheet cassette 403, as shown in FIG. 29D. At this time, sheet feed roller 6b of first sheet feeder 306 is allowed to contact the uppermost one of the sheets P in accommodating portion 3b.

As describe above, first sheet feeder 306 and second sheet feeder 60 are shifted selectively to an operating position or a non-operating position for sheet feeding as first sheet cassette 403 and second sheet cassette 430 are moved unitarily to and from the sheet feed position and as second sheet cassette 430 is moved on first sheet cassette 403 between the sheet feed position and the non-sheet-feed position. Second sheet cassette 430 may be moved back and forth by gripping a handle 30d that is provided at a downstream end of sheet receiver 30b as seen in the sheet discharge direction.

As shown in FIG. 29A, the height L4 of the sheet feed arm 60a of the second sheet feeder 60 may be smaller than the height L3 of sheet feed arm 6a of the first sheet feeder 306. The upper surface of the sheet P in first sheet cassette 403 forms an angle θ1 with a line between the pivot center of sheet feed arm 6a (axis of drive shaft 6d) and a point where sheet feed roller 6b contacts the upper surface of the sheet P. Similarly, the upper surface of the sheet P1 in second sheet cassette 430 forms an angle θ2 with a line between the pivot center of sheet feed arm 60a (axis of drive shaft 60d) and a point where sheet feed roller 60b contacts the upper surface of the sheet P1. θ1 may be substantially equal to Θ2, when L4 is smaller than L3, drive shafts 6d, 60d are at substantially the same height, and second sheet cassette 30 is at a position higher than first sheet cassette 403. Accordingly, the sheet feed force of sheet feed roller 6b may be substantially the same as that of sheet feed roller 60b.

According to the first through third embodiments of the present invention, as described above, sheet feed device 100, 101, 102 has first sheet cassette 3, 303, 403 set at the sheet feed position and second sheet cassette 30, 330 430 disposed movably on first sheet cassette 3, 303, 403. The first sheet cassette accommodates larger-sized sheets while the second sheet cassette accommodates smaller-sized sheets. Accordingly, feeding sheets of different sizes may be switched readily by moving second sheet cassette 30, 330, 430 between the sheet feed position closer to sheet feeder 6, 306, 60, and the non-sheet-feed position further away from the sheet feeder. When second sheet cassette 30, 330, 430 is at the sheet feed position, sheet feeder 6, 306, 60 feeds the sheets in second sheet cassette 30, 330, 430, and when second sheet cassette 30, 330, 430 is set at the non-sheet-feed position, sheet feeder 6, 306 feeds the sheets in first sheet cassette 3, 303, 403. This structure allows the user to avoid loading and unloading the sheets or removing second sheet cassette 30, 330, 430 from first sheet cassette 3, 303, 403.

In addition, according to the first through third embodiments of the present invention, each of the first and second sheet cassettes is provided with guide unit 34a, 34b, 41 that guides the side edges of the sheets in parallel with the sheet feed direction, and this sheets in the first and second sheet cassettes may properly be positioned and oriented. Second sheet cassette 30, 330, 430 may be provided with cutouts 70 that allow the user to access handle 38 in order to operate guide unit 34a, 34b of first sheet cassette 3, 303, 403 without removing the second sheet cassette 30, 330, 430 from the first sheet cassette 3, 303, 403, thereby facilitating sheet positioning in first sheet cassette 3, 303, 403 and regulation of the sheet feed direction.

In addition, according to the first through third embodiments of the present invention, second sheet cassette 30, 330, 430 may be connected movably and pivotably to the guide hole 35 formed in side plates 3c of first sheet cassette to be elongated in the sheet feed direction. Accordingly, second sheet cassette 30, 330, 430 is unlikely to come off the first sheet cassette 3, 303, 403, and readily may be inserted into and removed from housing 2 unitarily with first sheet cassette 3, 303, 403. Second sheet cassette 30, 330, 430 may be pivotable to provide a larger vertical space between the first and second sheet cassettes, facilitating reloading of the sheets in first sheet cassette 3, 303, 403.

In addition, according to the first through third embodiments of the present invention, the sheets in second sheet cassette 30, 330, 430, a well as sheets in the first sheet cassette 3, 303, 403, are separated and fed by the cooperation of sheet feed roller 6*b*, 60*b* and main inclined separation plate 8 provided at the downstream end of first sheet cassette 3, 303, 403 as seen in the sheet feed direction. Accordingly, the structure of sheet feed device 100, 101, 102 may be simple and compact.

According to a modified first and second sheet cassettes 103, 130, second sheet cassette 130 may be provided at its downstream end as seen in the sheet feed direction with auxiliary inclined separation plate 51 that cooperates with the sheet feed roller to feed the sheets one by one toward the recording unit. Accordingly, the sheets in second sheet cassette 130 are unlikely to be displaced and readily may be separated and fed.

In addition, according to the first through third embodiments of the present invention, when second sheet cassette 30, 330, 430 is moved on first sheet cassette 3, 303, 403 to the non-sheet-feed position in a direction opposite to the sheet feed direction, the upstream end of second sheet cassette 30, 330, 430 is located at substantially the same as or at a more upstream position than the upstream end of the first sheet cassette 3, 303, 403 as seen in the sheet feed direction. Accordingly, feeding the sheets in the first or second sheet cassette is readily switched by changing the position of the second sheet cassette with respect to the first sheet cassette.

In addition, according to the first through third embodiments of the present invention, when second sheet cassette 30, 330, 430 is set at sheet feed position on the first sheet cassette 3, 303, 403, second sheet cassette 330, 330, 430 may be held to first sheet cassette 3, 303, 403 by the engagement of engaging pieces 31, which project from the downstream end of the second sheet cassette as seen in the sheet feed direction, into positioning holes 8*b* formed in main inclined separation plate 8. Accordingly, the second sheet cassette 30, 330, 430 may be prevented from being displaced from the sheet feed position, thereby ensuing the stable and reliable separation and feeding of sheets in the second sheet cassette 30, 330, 430.

In addition, according to the first through third embodiments of the present invention, the second sheet cassette 30, 330, 430 comprises holding portion 30*a* for holding the sheets to be fed to recording unit 7, and sheet receiver 30*b* for receiving the sheets discharged from recording unit 7. Sheet receiver 30*b* may be formed integrally with holding portion 30*a*, and sheet receiver 30*b* and holding portion 30*a* may be shaped like a flat plate. Thus, no additional sheet receiver is needed separately, and the sheet holding and receiving portions can be simple in structure and compact in size. When second sheet cassette 30, 330, 430 is at the sheet feed position, smaller-sized sheets are received by the sheet receiver 30*b*, and when second sheet cassette 30, 330, 430 is at the non-sheet-feed position, larger-sized sheets are supported on the leading side by sheet receiver 306. Accordingly, sheet receiver 30*b* may receive different-sized sheets.

In sheet feed device 100, 101 according to the first and second embodiments of the present invention, by contact between cam follower 43 and the auxiliary cam 44, sheet feed roller 6*b* held by sheet feed arm 6*a* is movable up and down with respect to the sheets in second sheet cassette 30, 330 as second sheet cassette 30, 330 is moved back and forth with respect to sheet feed roller 6*b*, that is, moved between the sheet feed position and the non-sheet-feed position. When second sheet cassette 30, 330 is at the sheet feed position on first sheet cassette 3, 303, sheet feed roller 6*b* is allowed to contact the uppermost one of sheets in the second sheet cassette 3, 330. On the other hand, when second sheet cassette 30, 330 is away from the sheet feed position, sheet feed roller 6*b* is raised and unable to contact the sheets in second sheet cassette 30, 330. Accordingly, feeding of the sheets in second sheet cassette 30, 330 is performed only when second sheet cassette 30, 330 is at the sheet feed position, thereby preventing sheet misfeed or sheet jamming.

In sheet feed device 101 according to the second embodiment of the present invention, by the contact between end 43*a* of the cam follower 43 and main cam 55, sheet feed roller 6*b* held by sheet feed arm 6*a* is movable up and down with respect to main inclined separation plate 8 as first sheet cassette 303 is moved unitarily with second sheet cassette 330 with respect to sheet feed roller 6*b*. Accordingly, sheet feed 80 roller 6*b* does not collide with the inclined separation plate 8 when the first and second sheet cassettes are unitarily inserted into and removed from housing 2.

In sheet feed device 102 according to the third embodiment, the sheets in first sheet cassette 403 are fed by first sheet feeder 306, while the sheets in second sheet cassette 430 are fed by second sheet feeder 60. The first and second sheet feeders are shifted between the operating position and the non-operating position for sheet feeding as second sheet cassette 430 is moved back and forth with respect to the first sheet cassette 403. Accordingly, the sheet feeders are prevented from being activated erroneously, thereby preventing sheet misfeed or sheet jamming.

In addition, according to the third embodiment of the present invention, each of first sheet feeder 306 and second sheet feeder 60 comprises sheet feed roller 6*b*, 60*b* and cam follower 43, 61. The cam followers 43, 61 of the first and second sheet feeders 306, 60, respectively, may be arranged in directions opposite to each other and perpendicular to the sheet feed direction. Main and auxiliary cams 55, 44 contactable with the cam follower 43 of the first sheet feeder 306 and main and auxiliary cams 55,44 contactable with cam follower 61 of second sheet feeder 60 may be formed separately at different positions of the first and second sheet cassette 403, 430. Accordingly, up and down movements of each of sheet feed rollers 6*b*, 60*b* may be individually controlled.

In addition, according to the third embodiment of the present invention, auxiliary cam 44 that contacts the cam follower 61 of the second sheet feeder 60 has such a shape that sheet feed roller 60*b* of second sheet feeder 60 is held at an upper position when second sheet cassette 430 is moved back to the upstream side as seen in the sheet feed direction with respect to first sheet cassette 403. Accordingly, sheet feed roller 60*b* for second sheet cassette 430 is prevented from being activated erroneously to feed the undesired sheets in second sheet cassette 430.

In addition, according to the third embodiment of the present invention, auxiliary cam 44 that contacts cam follower 43 of first sheet feeder 306 has such a shape that sheet feed roller 6*b* of first sheet feeder 306 is held at an upper position when second sheet cassette 430 is moved forth to the downstream side as seen in the sheet feed direction with respect to first sheet cassette 403. Accordingly, sheet feed roller 6*b* for first sheet cassette 463 is prevented from being activated erroneously to feed the undesired sheets in first sheet cassette 403.

In image recording apparatus 1 into which sheet feed device 100, 101, 102 according to any of the embodiments of the present invention may be incorporated, recording unit 7, sheet feed path 9*a*, and sheet feeder 6, 306, 60 are accommodated in housing 2, and the first and second sheet cassettes are disposed at a lower position than recording unit 7 and are moveable inward and outward with respect to housing 2. Accordingly, sheets can be reloaded easily in the first and second sheet cassettes by pulling outward the first and second sheet cassettes set in housing 2.

In addition, image recording apparatus 1 may comprise media sensor 49 that detects the width of a sheet fed from the first and second sheet cassettes to recording unit 7, and cassette sensor 50 that detects the position of second sheet cassette 30, 330, 430. Accordingly, image recording on a sheet of wrong size is prevented, and an erroneous sheet cassette setting at the sheet feed position is detected before recording, thereby avoiding wasting the sheet and the time required for sheet feed.

While the invention has been described in connection with preferred embodiments, it will be understood by those of ordinary skill in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples only are considered as exemplary of the invention, with the true scope of the invention being defined by the following claims.

What is claimed is:

1. A sheet feed device comprising:
   a first tray comprising a first holding portion for holding a sheet;
   a second tray comprising a cam and a second holding portion for holding a sheet, and configured to move between a first position and a second position relative to the first tray, the second holding portion being above the first holding portion, and the second position being upstream from the first position in a sheet feed direction;
   a sheet feeder comprising a feed roller and a cam follower, and configured to feed a sheet selectively from the first tray and the second tray in the sheet feed direction; and
   a frame disposed above the second holding portion of the second tray and defining an accommodating space;
   wherein the feed roller of the sheet feeder is configured to be in a first roller position when the second tray is in the first position and to be in a second roller position when the second tray is in the second position, the feed roller in the first roller position contacting the second holding portion of the second tray, and the feed roller in the second roller position contacting the first holding portion of the first tray, and
   wherein the cam follower of the sheet feeder is configured to, when the second tray moves from the second position to a third position which is between the first position and the second position, follow the cam of the second tray such that the feed roller moves to a third roller position in which the feed roller is separated from the first holding portion and the second holding portion and in which at least a portion of the feed roller is accommodated in the accommodating space.

2. The sheet feed device according to claim 1, wherein the frame has an opening, and the at least a portion of the feed roller is configured to enter the accommodating space through the opening when the second tray moves from the second position to the third position.

3. The sheet feed device according to claim 1, wherein the first roller position is farther from the first holding portion of the first tray than the second roller position, and the third roller position is farther from the first holding portion than the first roller position.

4. The sheet feed device according to claim 1, wherein the sheet feeder further comprises an arm supporting the feed roller at a first end of the arm and configured to pivot about a second end of the arm.

5. The sheet feed device according to claim 4, wherein the first end of the arm is located downstream of the second end of the arm in the sheet feed direction.

6. The sheet feed device according to claim 4, wherein the cam follower of the sheet feeder is coupled to the arm of the sheet feeder.

7. The sheet feed device according to claim 4, wherein a portion of the arm of the sheet feeder is configured to enter the accommodating space when the second tray moves from the second position to the third position.

8. The sheet feed device according to claim 1, wherein the sheet feeder further comprises a drive shaft configured to drive the feed roller, the drive shaft being supported by the frame.

9. The sheet feed device according to claim 1, wherein the cam is disposed at one of opposite ends of the second tray in a width direction perpendicular to the sheet feed direction.

10. The sheet feed device according to claim 1, further comprising a housing, wherein the first tray and the second tray are removable from the housing.

11. A sheet feed device comprising:
    a first tray comprising a first holding portion for holding a sheet;
    a second tray comprising a cam and a second holding portion for holding a sheet, and configured to move between a first position and a second position relative to the first tray, the second holding portion being above the first holding portion, and the second position being upstream from the first position in a sheet feed direction;
    a sheet feeder comprising a feed roller and a cam follower, and configured to feed a sheet selectively from the first tray and the second tray in the sheet feed direction; and
    a frame disposed above the second holding portion of the second tray and defining an accommodating space;
    wherein the feed roller of the sheet feeder is configured to be in a first roller position when the second tray is in the first position and to be in a second roller position when the second tray is in the second position, the feed roller in the first roller position contacting the second holding portion of the second tray, and the feed roller in the second roller position contacting the first holding portion of the first tray, and
    wherein the cam follower of the sheet feeder is configured to, when the second tray moves from the first position to a third position which is between the first position and the second position, follow the cam of the second tray such that the feed roller moves to a third roller position in which the feed roller is separated from the first holding portion and the second holding portion and in which at least a portion of the feed roller is accommodated in the accommodating space.

12. The sheet feed device according to claim 11, wherein the frame has an opening, and the at least a portion of the feed roller is configured to enter the accommodating space through the opening when the second tray moves from the first position to the third position.

13. The sheet feed device according to claim 11, wherein the first roller position is farther from the first holding portion of the first tray than the second roller position, and the third roller position is farther from the first holding portion than the first roller position.

14. The sheet feed device according to claim 11, wherein the sheet feeder further comprises an arm supporting the feed roller at a first end of the arm and configured to pivot about a second end of the arm.

15. The sheet feed device according to claim 14, wherein the first end of the arm is located downstream of the second end of the arm in the sheet feed direction.

16. The sheet feed device according to claim 14, wherein the cam follower of the sheet feeder is coupled to the arm of the sheet feeder.

17. The sheet feed device according to claim 14, wherein a portion of the arm of the sheet feeder is configured to enter the accommodating space when the second tray moves from the first position to the third position.

18. The sheet feed device according to claim 11, wherein the sheet feeder further comprises a drive shaft configured to drive the feed roller, the drive shaft being supported by the frame.

19. The sheet feed device according to claim 11, wherein the cam is disposed at one of opposite ends of the second tray in a width direction perpendicular to the sheet feed direction.

20. The sheet feed device according to claim 11, further comprising a housing, wherein the first tray and the second tray are removable from the housing.

21. A sheet feed device comprising:
a first tray comprising a first holding portion for holding a sheet;
a second tray comprising a cam and a second holding portion for holding a sheet, and configured to move between a first position and a second position relative to the first tray, the second holding portion being above the first holding portion, and the second position being upstream from the first position in a sheet feed direction;
a sheet feeder comprising a feed roller and a cam follower, and configured to feed a sheet selectively from the first tray and the second tray in the sheet feed direction; and
a frame disposed above the second holding portion of the second tray and defining an accommodating space;
wherein the feed roller of the sheet feeder is configured to be in a first roller position when the second tray is in the first position and to be in a second roller position when the second tray is in the second position, the feed roller in the first roller position contacting the second holding portion of the second tray, and the feed roller in the second roller position contacting the first holding portion of the first tray, and
wherein the cam follower of the sheet feeder is configured to, when the second tray moves from the second position to a third position which is between the first position and the second position and when the second tray moves from the first position to the third position, follow the cam of the second tray such that the feed roller moves to a third roller position in which the feed roller is separated from the first holding portion and the second holding portion and in which at least a portion of the feed roller is accommodated in the accommodating space.

* * * * *